(12) United States Patent  
Shimazaki

(10) Patent No.: US 7,486,126 B2  
(45) Date of Patent: Feb. 3, 2009

(54) SEMICONDUCTOR INTEGRATED CIRCUIT WITH PULSE GENERATION SECTIONS

(75) Inventor: Yasuhisa Shimazaki, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 74 days.

(21) Appl. No.: 11/639,141

(22) Filed: Dec. 15, 2006

(65) Prior Publication Data

US 2007/0182475 A1 Aug. 9, 2007

(30) Foreign Application Priority Data

Feb. 7, 2006 (JP) ............................ 2006-029164  
Sep. 29, 2006 (JP) ............................ 2006-266171

(51) Int. Cl.  
*G06F 1/04* (2006.01)

(52) U.S. Cl. ..................... 327/295; 327/293; 713/401; 713/501

(58) Field of Classification Search ......... 327/291–293, 327/295, 564, 565; 713/400, 401, 500, 501, 713/513

See application file for complete search history.

(56) References Cited

U.S. PATENT DOCUMENTS 5,430,397 A * 7/1995 Itoh et al. ................... 326/101  
6,069,829 A * 5/2000 Komai et al. ................ 365/201  
6,590,434 B2 * 7/2003 Chung et al. ................ 327/277  
6,621,882 B2 * 9/2003 Denny et al. ................ 375/371  
2007/0097778 A1 * 5/2007 LaBerge ..................... 365/233

OTHER PUBLICATIONS

E. Takahashi, et al., "A post-silicon clock timing adjustment using genetic algorithms", 2003 Symposium on VLSI Circuits Digest of Technical Papers, pp. 13-16.

* cited by examiner

*Primary Examiner*—An T Luu  
(74) *Attorney, Agent, or Firm*—Miles & Stockbridge P.C.

(57) ABSTRACT

This invention provides a technique for enhancing an operating frequency and improving reliability in a system using at least level sense type sequence circuits as a plurality of sequence circuits. A microcomputer includes a clock generator configured as a clock supply source, functional modules operated in sync with a clock signal, level sense type sequence circuits which are contained in the functional modules and configured as clock supply destinations, a clock supply system which propagates the clock signal to the level sense type sequence circuits, etc. The clock supply system includes a clock wiring which propagates the clock signal outputted from the clock generator to ends thereof via a plurality of branches. At least pulse generators are disposed in the midstream of the clock wiring. Each of the pulse generators varies timing provided to change the falling edge of the clock signal, which defines an endpoint of an input operating period of each level sense type sequence circuit.

3 Claims, 13 Drawing Sheets

SEMICONDUCTOR INTEGRATED CIRCUIT WITH PULSE GENERATION SECTIONS

CROSS-REFERENCE TO RELATED APPLICATION

The present application claims priority from Japanese patent application No. 2006-266171 filed on Sep. 29, 2006, and Japanese patent application No. 2006-029164 filed on Feb. 7, 2006, the content of which is hereby incorporated by reference into this application.

BACKGROUND OF THE INVENTION

The present invention relates to a semiconductor integrated circuit operated in sync with a clock signal and a technique effective when applied to a semiconductor integrated circuit having level sense type sequence circuits as a plurality of sequence circuits corresponding to clock supply destinations, for example.

When a semiconductor integrated circuit such as a microcomputer is designed, the design of a clock supply system for propagating a clock signal outputted from a clock generator configured as a clock supply source to a plurality of sequence circuits or the like corresponding to clock supply destinations is essential. The clock supply system has a clock wiring. The clock wiring is configured as a clock tree structure for propagating the clock signal to ends thereof via a plurality of branches. The clock wiring is designed so as to assume a fixed-width and fixed-length wiring for the purpose of attaining a reduction in clock skew. The clock skew refers to a shift in the phase between the clock signals at the plural clock supply destinations to which the clock supply source is common. The phase shift of the clock signal is also grasped as an arrival time difference in clock signal between the clock supply source and each of the clock supply destinations, i.e., a variation in the propagation delay time of the clock signal. As the plural sequence circuits connected to the ends of the clock wiring, may be mentioned edge trigger type sequence circuits in each of which the rising edge of the clock signal is brought to an input/output operating period, and level sense type sequence circuits in each of which a period during which the clock signal is of a high level, is brought to an input/output operating period.

A system using the edge trigger type sequence circuits is formed with a plurality of data paths including pre-stage edge trigger type sequence circuits each configured as the data transmission side, post-stage edge trigger type sequence circuits each configured as the data reception side, and combination circuits which are disposed between these edge trigger type sequence circuits and perform predetermined arithmetic processing or the like. In each of such data paths, the timing provided to allow the predetermined combination circuit to output the result of arithmetic operation might pass or go beyond the timing provided to change the rising edge of the clock signal supplied to the post-stage edge trigger type sequence circuit, i.e., the input/output operating period. In this case, the post-stage edge trigger type sequence circuit cannot fetch or take the result of arithmetic operation by the predetermined combination circuit, thus causing a MAX delay violation. As the cause of the MAX delay violation, variations in the amount of delay at each combination circuit and the like are also considered as well as the clock skew.

In order to relieve the MAX delay violation, there is considered a method for grasping the clock skew and the variations in the amount of delay at each combination circuit as design values every data path, for example at the design stage of the microcomputer and adjusting the change timing at the rising edge of the clock signal supplied to each post-stage edge trigger type sequence circuit on the basis of the design values after the manufacture of the microcomputer. However, the design values grasped at the design stage of the microcomputer are shifted from values grasped from the result of testing in a test process after its manufacture due to factors such as variations in manufacture, a drop in power supply voltage, etc., which cannot be grasped accurately at the design stage.

A non-patent document 1 (E. Takahashi, et al., "A post-silicon clock timing adjustment using genetic algorithms, "2003 Symposium on VLSI Circuits Digest of Technical Papers, pp. 13-16) discloses a technique wherein in a system using edge trigger type sequence circuits, a variable delay circuit capable of changing a propagation delay time of a clock signal is disposed in the midstream of a clock wiring configured as a clock tree structure thereby to make it possible to adjust a clock skew according to the result of testing in a test process. According to the present technique, the amount of delay of a clock signal is changed by the variable delay circuit to adjust the timing provided to change the rising edge of the clock signal, thereby relieving a MAX delay violation.

SUMMARY OF THE INVENTION

The present inventors have discussed a means that adjusts a clock skew to increase an operating frequency and improve reliability in a system using at least level sense type sequence circuits as a plurality of sequence circuits. The present system is formed with a plurality of data paths including pre-stage level sense type sequence circuits, post-stage level sense type sequence circuits, and predetermined combination circuits respectively disposed between these level sense type sequence circuits. Since the input/output operating period of each level sense type sequence circuit is set as, for example, a period during which a clock signal is of a high level, no MAX delay violation occurs in each data path if the timing provided to allow the predetermined combination circuit to output the result of arithmetic operation is placed within the input/output operating period of each of the post-stage level sense type sequence circuits. Therefore, if the technique of the non-patent document 1 is applied to the system and the change timing at the rising edge of the clock signal is made variable, there is a high possibility that the MAX delay violation will be relieved.

In the technique of the non-patent document 1, however, the clock signal is delayed by the variable delay circuit. Therefore, when the change timing at the rising edge of the clock signal is made variable, the timing provided to change the falling edge also changes correspondingly. Therefore, when the technique of the non-patent document 1 is applied to the system, it becomes difficult to relieve a MIN delay violation. The MIN delay violation is easy to occur where the change timing at the falling edge is delayed by the variable delay circuit and the amount of delay by each combination circuit is small. In this case, the timing provided to allow the combination circuit to output the result of arithmetic operation is placed or put not only in a cycle of the clock signal during which the post-stage level sense type sequence circuit is brought to the input/output operating period, but also in a cycle of the clock signal during which the pre-stage level sense sequence circuit is brought to the input/output operating period. Therefore, data is passed from the pre-stage level sense type sequence circuit to the post-stage level sense type sequence circuit within the same cycle of the clock signal, thus causing a MIN delay violation. In brief, the delay of the clock signal by the variable delay circuit alone cannot relieve both MAX and MIN delay violations in the system. It is difficult to enhance reliability after the operating frequency has been enhanced.

An object of the present invention is to provide a technique for enhancing an operating frequency and improving reliability in a system using at least level sense type sequence circuits as a plurality of sequence circuits.

The above, other objects and novel features of the present invention will become apparent from the description of the present specification and the accompanying drawings.

Summaries of representative ones of the inventions disclosed in the present application will briefly be explained as follows:

A semiconductor integrated circuit according to the present invention includes a clock generator (2), a clock wiring (20) which propagates a clock signal outputted from the clock generator to ends thereof via a plurality of branches, and a plurality of sequence circuits (12 through 15) connected to the ends of the clock wiring. At least level sense type sequence circuits (12 through 14) are provided as the plurality of sequence circuits. A first variable circuit (26, 28, 29) for varying timing provided to change the clock signal, which defines an endpoint of an input operating period of each level sense type sequence circuit, is provided in the clock wiring.

From the above, the first variable circuit shifts the endpoint of an input/output operating period of each level sense type sequence circuit, i.e., change timing at the falling edge that changes from, for example, a high level to a low level thereby to enable a reduction in pulse width of the clock signal. Thus, in data paths in which combination circuits small in delay amount are respectively disposed between the level sense type sequence circuits, the timing provided to allow each combination circuit to output the result of arithmetic operation or the like can be positioned within a cycle different from the cycle of the clock signal in which each pre-stage level sense type sequence circuit configured as the data transmission side in each data path is brought to the input/output operating period. Data outputted from the corresponding combination circuit is fetched into the corresponding post-stage level sense type sequence circuit configured as the data reception side within the cycle different from the above cycle. That is, since no data is passed from the pre-stage level sense type sequence circuits to the post-stage level sense type sequence circuits within the same cycle of the clock signal, a MIN delay violation can be avoided. Further, when no combination circuits are disposed between the level sense type sequence circuits in the data paths, the MIN delay violation becomes easier to occur. Even in such a case, however, the change timing at the falling edge of the clock signal is shifted by the first variable circuit to make its pulse width smaller, whereby the MIN delay violation can be avoided.

A test process determines whether a semiconductor integrated circuit is capable of outputting output data proper for predetermined input data while the operating frequency of the clock signal is being gradually increased. When it is found that the proper output data cannot be outputted due to, for example, a MIN delay violation, the pulse width is reduced by the first variable circuit to avoid the MIN delay violation. Thereafter, the operating frequency is increased again and the above determination is made in this condition. Thus, the system using at least level sense type sequence circuits configured as the plural sequence circuits is capable of avoiding the MIN delay violation and enhancing reliability while the operating frequency is being enhanced in the test process.

As a specific one form of the present invention, a second variable circuit (27, 30) series-connected to the first variable circuit and capable of changing a propagation delay time of the clock signal is provided in the clock wiring. From the above, each pulse per se can be shifted by the second variable circuit after the pulse width of the clock signal has been varied by the first variable circuit. Thus, the first variable circuit is capable of avoiding a MIN delay violation in a given data path. Further, in the following other data path in which each combination circuit large in delay amount is disposed, the second variable circuit is capable of positioning timing provided to cause the combination circuit to output data, within an input/output operating period of each post-stage level sense type sequence circuit in other data path. That is, such a MAX delay violation that the post-stage level sense type sequence circuit cannot fetch therein the data outputted from the combination circuit can be avoided.

As another specific form of the present invention, edge trigger type sequence circuits (15) are provided as part of the plural sequence circuits. From the above, the present invention can be applied even to a system in which the level sense type sequence circuits and the edge trigger type sequence circuits in each of which an input/output operating period is set to, for example, timing provided to change the rising edge of the clock signal, exist in mixed form.

As a further specific form of the present invention, the clock wiring has a third variable circuit (31) series-connected to the edge trigger type sequence circuits and capable of changing a propagation delay time of the clock signal. From the above, when the third variable circuit increases the amount of delay of the clock signal supplied to each post-stage edge trigger type sequence circuit and shifts its pulse per se, the input operating period of the post-stage edge trigger type sequence circuit, i.e., the timing provided to change the rising edge of the clock signal is delayed. Even when a data path in which each combination circuit large in delay amount is disposed between the edge trigger type sequence circuits, is formed, no MAX delay violation occurs in the data path if done in the above-described manner.

As a still further specific form of the present invention, the first variable circuit includes a register (32), a selection circuit (33) and a logic circuit (34). The register holds therein control information for designating timing provided to change the clock signal. The selection circuit has a plurality of delay paths different in delay time and selects the delay paths in accordance with the control information held in the register. The logic circuit determines the change timing in accordance with the output of the selection circuit and the clock signal. From the above, the control information is information obtained in a test process for adjusting a clock skew. The control information is defined as, for example, a value corresponding to the amount of delay of the clock signal, which is required by a post-stage sequence circuit in each data path having caused a MIN delay violation. Since the number of data paths formed in functional modules is enormous, they are searched in the optimization algorithms such as genetic algorithms, whereby the above value is obtained. The control information has the number of bits corresponding to the number of delay paths selectable by the selection circuit. If done in this way, then the selection circuit is capable of changing the amount of delay of the clock signal, based on the control information. The logic circuit determines change timing at the falling edge of the clock signal, based on the amount of delay of the clock signal thereby to make it possible to avoid a MIN delay violation.

As a still further specific form of the present invention, the logic circuit includes a gate circuit (85) for outputting a level change-free signal in accordance with an enable signal. From the above, the sequence circuits brought to, for example, a sleep state and contained in each functional module free of the need for the supply of the clock signal, of the plurality of sequence circuits connected to the ends of the clock wiring can be set so as not to be supplied with the clock signal. It is thus possible to attain a reduction in power.

As a still further specific form of the present invention, a nonvolatile storage or memory means (10), which stores the control information held in the register, is further provided. From the above, the control information used for the adjustment of the clock skew in the test process can be held even at time of power shutoff. Thus, the control information inherent in each product is incorporated into the product itself. The control information can be used when, for example, the characteristic of the product is confirmed.

As a still further specific form of the present invention, the pulse generator includes a first pulse generation section (100) which generates a first pulse signal synchronized with a rising edge of the clock signal, a second pulse generation section (200) which generates a second pulse signal synchronized with a falling edge of the clock signal, and a logic circuit (300) which combines the first pulse signal and the second pulse signal together and outputs the result of combination. According to such a configuration, the rising edge of a pulse clock signal (PCLK) appears at a double frequency with respect to the rising edge of the clock signal (CLK). When it is desired to operate an in-chip logic circuit at a predetermined frequency, a clock signal of a frequency equivalent to one-half the frequency may be distributed in a clock tree located upstream of the clock pulse generator. Thus, the frequency of the clock signal in the clock tree located upstream from the clock pulse generator can be reduced to ½, and power consumption can be reduced with a decrease in the number of charges and discharges thereat.

At this time, the first pulse generation section can include a first variable delay circuit (107) capable of adjusting a pulse width of the first pulse signal. The second pulse generation section can include a second variable delay circuit (203) capable of adjusting a pulse width of the second pulse signal. Further, the second pulse generation section can be provided with a third variable delay circuit (208) capable of adjusting the amount of delay of the second pulse signal.

The pulse generator can be provided with a variable delay circuit (145) capable of simultaneously adjusting the pulse width of the first pulse signal and the pulse width of the second pulse signal.

The first pulse generation section and the second pulse generation section can respectively be provided with control logics (106 and 207) capable of stopping transmission of the first pulse signal and the second pulse signal to the logic circuit in accordance with a common enable signal.

The first pulse generation section can be provided with a first control logic (106) capable of stopping transmission of the first pulse signal to the logic circuit in accordance with a first enable signal. The second pulse generation section can be provided with a second control logic (207) capable of stopping transmission of the second pulse signal to the logic circuit in accordance with a second enable signal.

Advantageous effects obtained by a representative one of the inventions disclosed in the present application will briefly be explained as follows:

A system using at least level sense type sequence circuits as plural sequence circuits is capable of enhancing an operating frequency and improving reliability.

DETAILED DESCRIPTION OF THE PREFERRED EMBODIMENTS

First Preferred Embodiment

Figure 2:
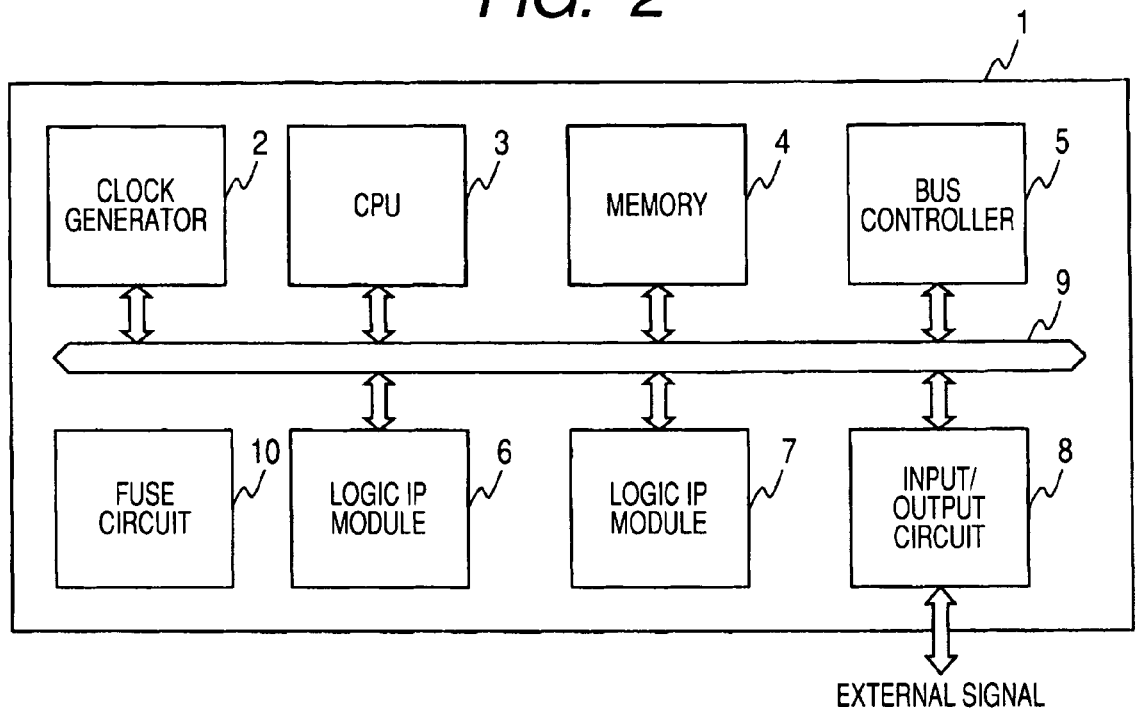
FIG. 2 is an explanatory diagram illustrating a schematic configuration of a microcomputer showing one example of a semiconductor integrated circuit according to an embodiment of the present invention.

FIG. 2 illustrates a schematic configuration of a microcomputer showing one example of a semiconductor integrated circuit according to a first embodiment of the present invention. The microcomputer 1 includes a clock generator 2 provided as a clock supply source, which generates a clock signal, a central processing unit (CPU) 3 corresponding to a plurality of functional modules each operated in sync with the clock signal, a memory 4, a bus controller 5, logic IP (Intellectual Property) modules 6 and 7, an input/output circuit 8, etc. These functional modules and the clock generator 2 are respectively connected via an internal bus 9. The microcomputer 1 is also equipped with a fuse circuit 10. The CPU 3 performs all control of the microcomputer 1, based on programs or the like stored in the memory 4. The memory 4 stores programs to be executed by the CPU 3 and fixed data therein and also stores the result of operation by the CPU 3 therein. Further, the memory 4 also serves as a working area of the CPU 3. The bus controller 5 controls a bus cycle adapted to a target for access by the CPU 3. The logic IP modules 6 and 7 are circuit blocks each having a predetermined function. The input/output circuit 8 has an input/output buffer and performs the input/output of an external signal and the like from and to the outside.

Figure 1:
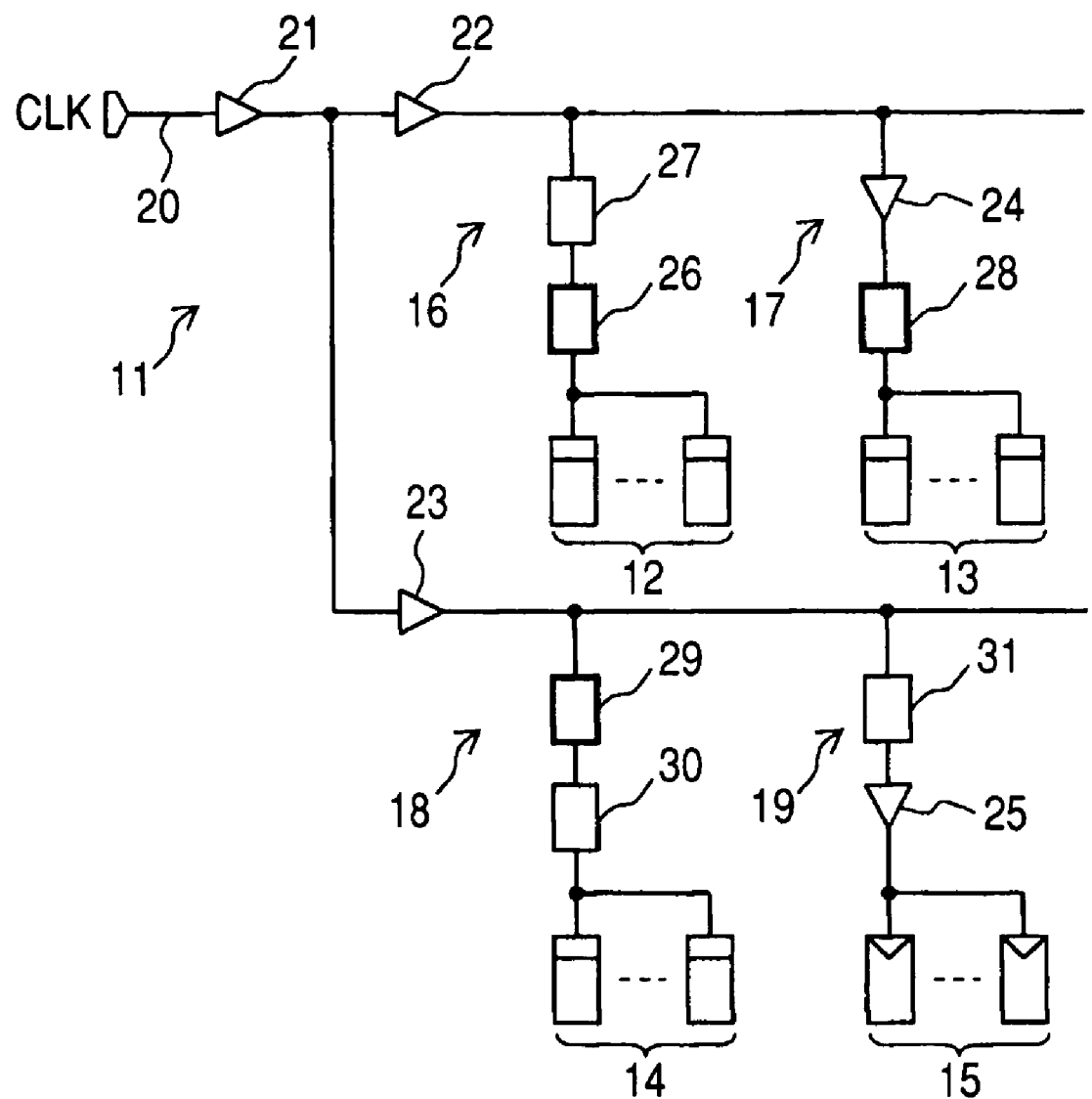
FIG. 1 is an explanatory diagram illustrating a clock supply system of a microcomputer.

Each of the functional modules has a plurality of sequence circuits 12 through 15 or the like configured as destinations for the supply of a clock signal propagated from a clock supply system 11 shown in FIG. 1. Further, the functional module is formed with data paths including, for example, pre-stage sequence circuits each provided as the data transmission side and post-stage sequence circuits each provided on the data reception side. The data paths are formed by an appropriate number and kind according to the specs of the functional modules as in the case in which, for example, combination circuits for performing predetermined arithmetic computations are respectively disposed between the pre-stage and pos-stage sequence circuits. Of these data paths, the paths in which the possibility that MAX and MIN delay violations will occur in particular at a design stage is judged high, are referred to as "critical paths".

The MAX delay violation and the MIN delay violation should essentially occur at the critical paths grasped at the design stage. However, the microcomputer 1 has the possibility that variations in delay amount will occur in the combination circuits due to factors such as variations in manufacture, a drop in power supply voltage and the like, which cannot accurately be grasped at the design stage. Due to the variations in the delay amounts of such combination circuits, the MAX delay violation and the MIN delay violation might occur in the data paths other than the critical paths. Therefore, a test process is required. In the test process, a data path in which MAX and MIN delay violations have actually occurred is specified and delay control information CNT (see FIG. 3) indicative of how to adjust the amount of delay of the clock signal supplied to each post-stage sequence circuit in the specified data path is obtained. The delay control information is a value corresponding to the amount of delay of the clock signal every specified data path and is searched using an optimizing algorithm such as a genetic algorithm. The delay control information is written into the fuse circuit 10.

The test process is of a process executed at a control or adjustment stage of a design stage, a manufacturing stage, the adjustment stage and a product shipment stage for the microcomputer 1. The test process determines whether the microcomputer 1 is capable of outputting output data proper for predetermined input data while the operating frequency of the clock signal is being gradually increased. When it is found that the proper output data is not outputted due to the MAX delay violation or the MIN delay violation, the clock signal supplied to the post-stage sequence circuit in the specified data path is adjusted and the above determination is performed again. When the proper output data is outputted, the operating frequency is further increased. Thus, the maximum operating frequency of the microcomputer 1 is determined.

The MAX delay violation is apt to occur where the amount of delay of a combination circuit is large. That is, the MAX delay violation means that the timing provided to output the result of computation from the corresponding combination circuit passes through or goes beyond an input/output operating period of a post-stage sequence circuit and the post-stage sequence circuit cannot fetch the result of computation therein. The MIN delay violation is easy to take place where the amount of delay of a combination circuit is small. In such a case, for example, the output timing of the combination circuit might be placed or located not only in a cycle of the clock signal during which a post-stage level sense sequence circuit is brought to an input/output operating period but also in a cycle of the clock signal during which a pre-stage level sense sequence circuit is brought to an input/output operating period. Under such circumstances, data inputted to the pre-stage sequence circuit is computed by the corresponding combination circuit within the same cycle of the clock signal. The result of arithmetic operation is inputted to the post-stage sequence circuit and further outputted to the following other combination circuit. Such a state is called "data pass-through, i.e., MIN delay violation".

One example of the clock supply system 11 of the microcomputer 1 is shown in FIG. 1. The clock supply system 11 forms clock propagation paths 16 through 19 which extend from a clock generator 2 provided as a clock supply source to the plural sequence circuits 12 through 15 provided as the clock supply destinations. As the plural sequence circuits 12 through 15, there are known level sense type sequence circuits 12 through 14 such as pulse latches in which a period during which a clock signal is high in level is set to an input/output operating period, and an edge trigger type sequence circuit 15 such as a flip-flop in which change timing at the rising edge of the clock signal is defined as an input/output operating period. That is, the clock supply system 11 is applied to such a system that the level sense type sequence circuits 12 through 14 and the edge trigger type sequence circuit 15 are provided in mixed form.

Each of the clock propagation paths 16 through 19 is formed by a clock wiring 20 or the like. The clock wiring 20 is configured as a clock tree structure and propagates the clock signal outputted from the clock generator 2 to the plural sequence circuits 12 through 15 connected to terminals of a plurality of branches, via the plural branches. Although not adapted to the drawing, the clock wiring 20 is configured as a fixed-width and fixed-length wiring. In order to equalize drive capacities every same hierarchy based on the branches, clock buffers 21 through 25 are placed midway through the clock wiring 20. Such a clock supply system 11 is capable of reducing a clock skew to some extent. The clock skew means variations in the time required to propagate the clock signal through the clock supply destinations that share the clock supply source, i.e., the level sense type sequence circuits 12 through 14 and the edge trigger type sequence circuit 15.

The clock buffers 21 and 22, a pulse generator 26 and a variable delay circuit 27 series-connected to the pulse generator 26 are placed in the midstream of the clock wiring 20 over the clock propagation path 16 extending from the clock generator 2 to the level sense type sequence circuit 12. The clock buffers 21, 22 and 24 and a pulse generator 28 are disposed in the midstream of the clock wiring 20 over the clock propagation path 17 extending to the level sense type sequence circuit 13. The clock buffers 21 and 23, a pulse generator 29 and a variable delay circuit 30 series-connected to the pulse generator 29 are placed in the midstream of the clock wiring 20 over the clock propagation path 18 extending to the level sense type sequence circuit 14. Further, the clock buffers 21, 23 and 25 and a variable delay circuit 31 are placed in the midstream of the clock wiring 20 over the clock propagation path 19 extending to the edge trigger type sequence circuit 15.

Figure 3:
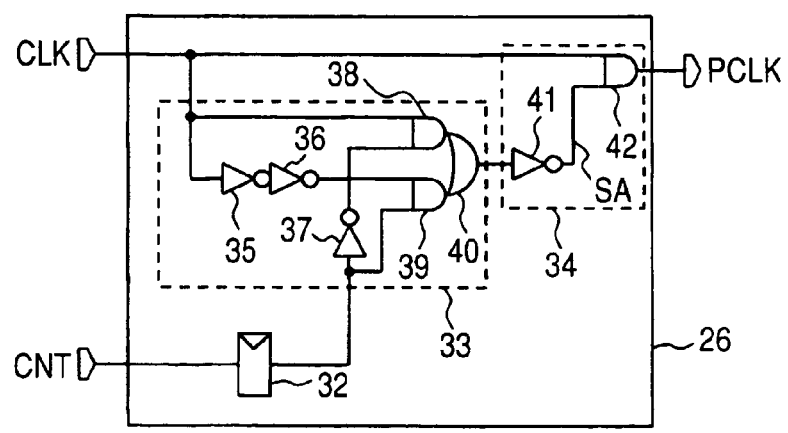
FIG. 3 is an explanatory diagram illustrating a circuit configuration of a pulse generator.

A circuit configuration of the pulse generator 26 is illustrated in FIG. 3. Since other pulse generators 28 and 29 are similar to the pulse generator 26, their explanations are omitted suitably or when superfluous. The pulse generator 26 is a circuit which outputs a clock signal CLK propagated from the clock generator 2 as a pulse clock signal PCLK according to a delay control signal CNT outputted from the CPU 3 or the like. The pulse generator 26 is equipped with a register 32, a selection circuit 33, a logic circuit 33 and the like. Control information for designating change timing of the clock signal CLK is set to the register 32 according to the delay control signal CNT. The selection circuit 33 is a circuit which has, for example, two delay paths different in delay time and selects the corresponding delay circuit according to the control information set to the register 32. The selection circuit 33 is equipped with inverter circuits 35 through 37, AND gate circuits (hereinafter described as AND circuits) 38 and 39 which takes the ANDing of two inputs, and an OR gate circuit (hereinafter described as OR circuit) 40 which takes the OR of two inputs. Delay times of the delay paths differ depending on the number of the inverter circuits disposed on the paths. The logic circuit 34 is a circuit which determines the change timing of the clock signal CLK according to the output of the selection circuit 33 and the clock signal CLK. The logic circuit 34 is equipped with an inverter circuit 41 and an AND circuit 42.

Figure 4:
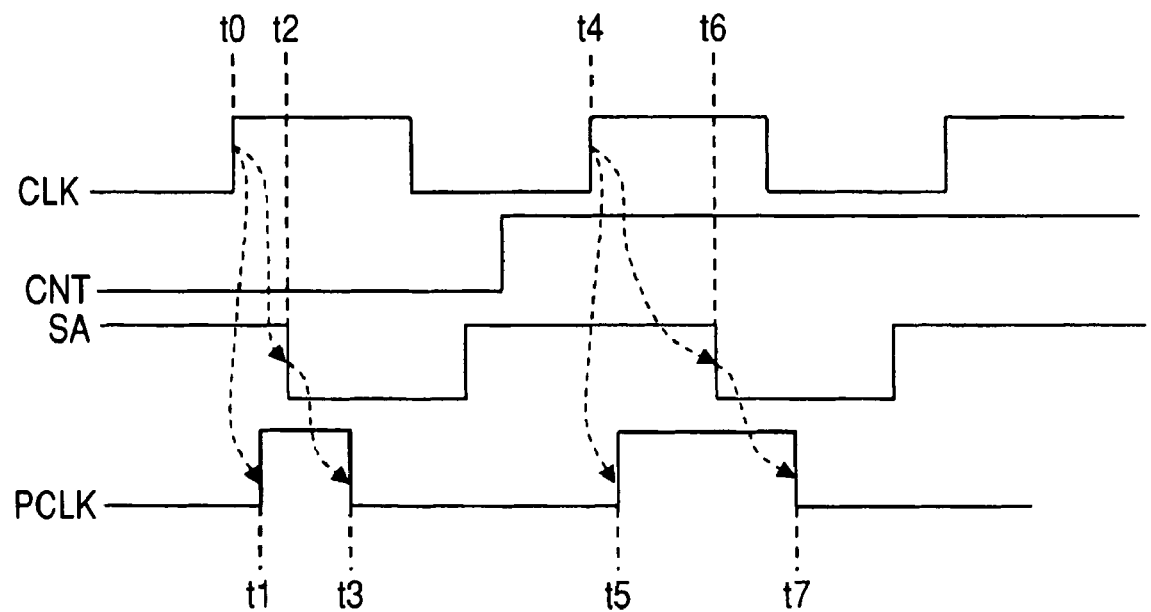
FIG. 4 is a timing chart showing operating timings of the pulse generator.

The operation of the pulse generator 26 from which the pulse clock signal PCLK is produced will be explained below using a timing chart of the pulse generator 26, which is illustrated in FIG. 4. For convenience of explanation, the output of the inverter circuit 41 in the logic circuit 34 is represented as a signal SA here. Since the clock signal CLK is "1 (which means a high level)" and the signal SA is "1" at a time t0 in the first instance, the two inputs of the AND circuit 42 are both brought to "1" and hence the pulse clock signal PCLK edge-changes from a low level to a high level at a time t1 with a slight delay amount. In brief, the time t1 is defined as change timing at the rising edge of the pulse clock signal.

Since the clock signal CLK is "1" at the time t0, one input of the AND circuit 38 is brought to "1" and one input of the AND circuit 39 is brought to "1" by the two inverter circuits 35 and 36. Since the delay control signal CNT is "0 (which means a low level)", the control information set to the register 32 is also brought to "0". At this time, the other input of the AND circuit 38 is brought to "1" because the control information "0" is inverted by the inverter circuit 37. The other input of the AND circuit 39 is brought to "0" since the control information "0" is inputted as it is. Thus, since the output of the AND circuit 38 is brought to "1" and the output of the AND circuit 39 is brought to "0", the output of the OR circuit 40 is taken in the form of logical ORing and brought to "1". And the output of the OR circuit 40 is inverted by the inverter circuit 41, followed by being taken out as the signal SA. Since the signal SA is based on the output of the AND circuit 38, it is brought to "0" at a time t2 with the amount of delay by the one inverter circuit 41 disposed on the path.

Since the clock signal CLK is "1" and the signal SA is "0" at the time t2, the output of the AND circuit 42 is brought to "0". At this time, the pulse clock signal PCLK edge-changes from a high level to a low level at a time t3 with a slight delay amount from the time t2. In brief, the time t3 is defined as change timing at the falling edge of the pulse clock signal. Since either the clock signal CLK or the signal SA is "0" at times t3 to t4, the pulse clock signal PCLK is brought to a low level.

Since the clock signal CLK is "1" and the signal SA is "1" at a time t4, the two inputs of the AND circuit 42 are both brought to "1", and the pulse clock signal PCLK edge-changes from a low level to a high level at a time t5 with a slight delay amount. In brief, the time t5 is defined as change timing at the rising edge of the pulse clock signal.

Since the clock signal CLK is "1" at the time t4, one input of the AND circuit 38 is brought to "1" and one input of the AND circuit 39 is brought to "1" by the two inverter circuits 35 and 36. Since the delay control signal CNT is "1", the control information set to the register 32 is also brought to "1". At this time, the other input of the AND circuit 38 is brought to "0" since the control information "1" is inverted by the inverter circuit 37. The other input of the AND circuit 39 is "1" because the control information "1" is inputted as it is. Thus, since the output of the AND circuit 38 is brought to "0" and the output of the AND circuit 39 is brought to "1", the output of the OR circuit 40 is taken in the form of logical ORing and brought to "1". Then, the output of the OR circuit 40 is inverted by the inverter 41, followed by being taken out as the signal SA. Since the signal SA is based on the output of the AND circuit 39, it is brought to "0" at a time t6 with the amounts of delay by the three inverter circuits 35, 36 and 41 disposed on their corresponding paths.

Since the clock signal CLK is "1" and the signal SA is "0" at the time t6, the output of the AND circuit 42 is brought to "0". At this time, the pulse clock signal PCLK edge-changes from a high level to a low level at a time t7 with a slight delay amount from the time t6. In brief, the time t7 is defined as change timing at the falling edge of the pulse clock signal.

Thus, since the delay amount from the times t0 to t1 and the delay amount from the times t4 to t5 are approximately identical to each other at the pulse clock signal PCLK, the change timing at each rising edge remains unchanged. Since, however, the delay amount from the times t0 to t2 and the delay amount from the times t4 to t6 change depending on the selection of the delay paths by the selection circuit 33, the change timing at each falling edge is made variable. In brief, since the selection circuit 33 selects the delay path small in delay amount if the delay control signal CNT is "0", the pulse generator 26 makes earlier the fall timing of the pulse clock signal PCLK to reduce a pulse width. Since the selection circuit 33 selects the delay path large in delay amount if the delay control signal CNT is "1", the pulse generator 26 delays or makes later the fall timing of the pulse clock signal PCLK to enlarge a pulse width.

Thus, since the pulse generators 26, 28 and 29 are disposed in the midstream of the clock wiring 20 with the level sense type sequence circuits 12 through 14 corresponding to the clock supply destinations, the clock supply system 11 can change the endpoint of the input/output operating period for each of the level sense type sequence circuits 12 through 14, i.e., the change timing at the falling edge of the pulse clock signal PCLK.

Figure 5:
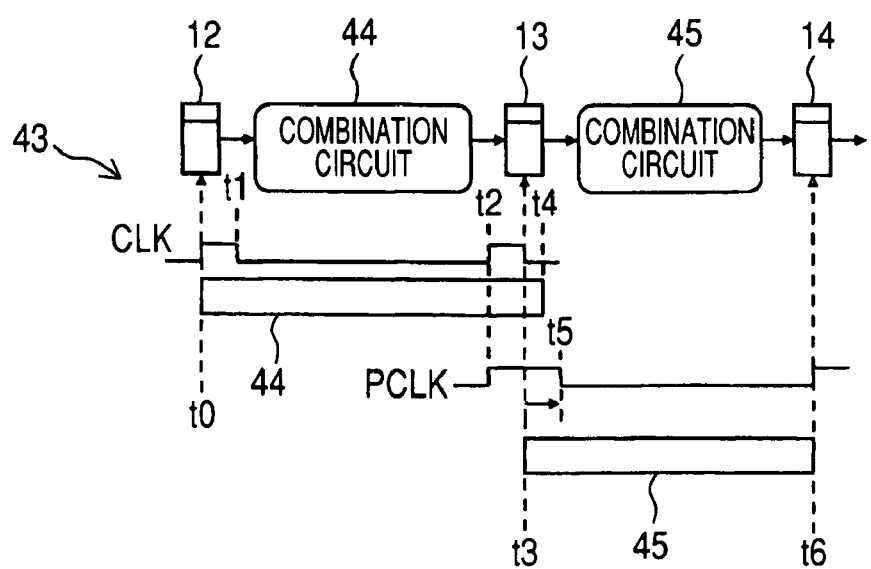
FIG. 5 is an explanatory diagram illustrating a state in which the amount of delay in change timing at the falling edge of a clock signal is increased to avoid a MAX delay violation.

A description will now be made, using FIG. 5, of a case in which a MAX delay violation is avoided by increasing the amount of delay in the change timing at each rising edge of the clock signal CLK. A data path 43 is constituted of, for example, three level sense type sequence circuits 12, 13 and 14 and combination circuits 44 and 45 respectively placed between these. Since the pre-stage level sense type sequence circuit 12 is first brought to an input/output operating period by the clock signal CLK at times t0 and t1, it outputs predetermined data to the combination circuit 44 at the time t0, for example. Here, the post-stage level sense type sequence circuit 13 is operated such that its input/output operating period is set between times t2 and t3 of the clock signal CLK. On the other hand, the combination circuit 44 is large in delay time and does not reach the completion of arithmetic processing within one cycle of the clock signal CLK. That is, the timing provided to output the result of arithmetic operation by the combination circuit 44 becomes a time t4 that goes beyond or passes the time t3, so that the result of arithmetic operation is not fetched into the post-stage level sense type sequence circuit 13, thus causing the MAX delay violation.

Thus, in the test process, for example, the CPU 3 or the like generates a delay control signal CNT "1" to enlarge a pulse width and outputs it to the pulse generator 28. Then, the pulse generator 28 outputs a pulse clock signal PCLK at which the change timing at the falling edge of the clock signal CLK is changed to a time t5, to the level sense type sequence circuit 13. Thus, since the timing provided to output the result of arithmetic operation by the combination circuit 44 is located within between the times t2 and t5 brought to the input/output operating period of the post-stage level sense type sequence circuit 13, the MAX delay violation can be avoided. As viewed from the combination circuit 45, the level sense type sequence circuit 13 configured as the data transmission side outputs predetermined data to the combination circuit 45 at the time t4 of the pulse clock signal PCLK, for example. Since the combination circuit 45 is not so large in delay time, it terminates predetermined computing processing between the times t4 and t6 of the pulse clock signal CLK, for example and outputs the result of arithmetic operation at the time t6. Since the post-stage level sense type sequence circuit 14 is brought to an input/output operating period from the time t6, no MAX delay violation is produced thereat.

Figure 6:
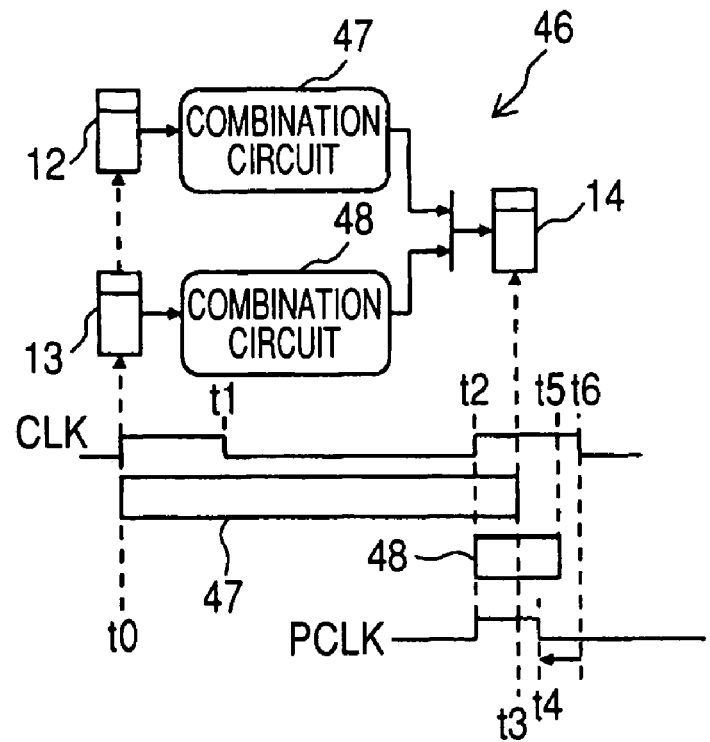
FIG. 6 is an explanatory diagram illustrating a state in which the amount of delay in change timing at the falling edge of the clock signal is reduced to avoid a MIN delay violation.

A description will now be made, using FIG. 6, of a case in which the amount of delay in change timing of the rising edge of the clock signal CLK is reduced to avoid a MIN delay violation. A data path 46 is constituted of, for example, three level sense type sequence circuits 12, 13 and 14 and combination circuits 47 and 48. Since the pre-stage level sense type sequence circuit 12 is first brought to an input/output operating period by the clock signal CLK at times t0 and t1, it outputs predetermined data to the combination circuit 47 at the time t0, for example. Here, the post-stage level sense type sequence circuit 14 is operated such that its input/output operating period is set between times t2 and t3 of the clock signal CLK.

In the combination circuit 47, the delay time is large, its arithmetic operation is not completed within one cycle of the clock signal CLK, and the timing provided to output the result of arithmetic operation thereby is brought to the time t3. However, the output timing is placed within the input/output operating period of the post-stage level sense type sequence circuit 14. Thus, since the result of computation by the combination circuit 47 is fetched or taken into the post-stage level sense type sequence circuit 14, no MAX delay violation is produced.

On the other hand, the combination circuit 48 is small in delay amount and can terminate an arithmetic operation within the times t2 to t5. That is, since the pulse width of the clock signal CLK is large, the timing provided to output each of the results of computations by the combination circuits 47 and 48 is placed within the same cycle of the clock signal CLK brought to the input/output operating period of the post-stage level sense type sequence circuit 14. Therefore, the results of computations by the two combination circuits 47 and 48 are fetched into the post-stage level sense type sequence circuit 14 within the same cycle, thus causing the MIN delay violation.

Thus, in the test process, for example, the CPU 3 or the like generates a delay control signal CNT "0" for reducing a pulse width and outputs it to the pulse generator 29. Then, the pulse generator 29 outputs a pulse clock signal PCLK at which the change timing at the falling edge of the clock signal CLK is changed from the time t6 to the time t4, to the level sense type sequence circuit 14. Thus, the timing provided to output the result of arithmetic operation by the combination circuit 48 is not located within between the times t2 and t4 brought to the input/output operating period of the post-stage level sense type sequence circuit 14. Therefore, since the results of computations by the combination circuits 47 and 48 are brought to the post-stage level sense type sequence circuit 14 within different cycles, the MIN delay violation can be avoided.

Figure 7:
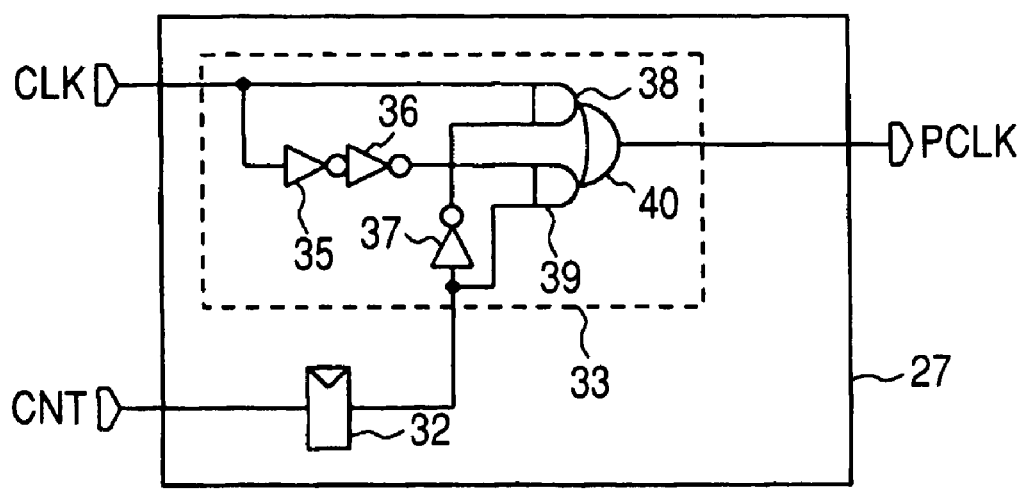
FIG. 7 is an explanatory diagram illustrating a circuit configuration of a variable delay circuit.

A circuit configuration of the variable delay circuit 27 is illustrated in FIG. 7 as one example. Since other variable delay circuits 30 and 31 are similar to the variable delay circuit 27, their explanations are appropriately omitted. Further, the explanations of a circuit configuration common to the pulse generator 26 will appropriately be omitted. The variable delay circuit 27 is equipped with the above-described register 32 and selection circuit 33. The variable delay circuit 27 outputs a pulse clock signal PCLK whose pulse per se is shifted, without varying a propagation delay time of a clock signal CLK, i.e., changing the pulse width of the clock signal CLK.

Figure 8:
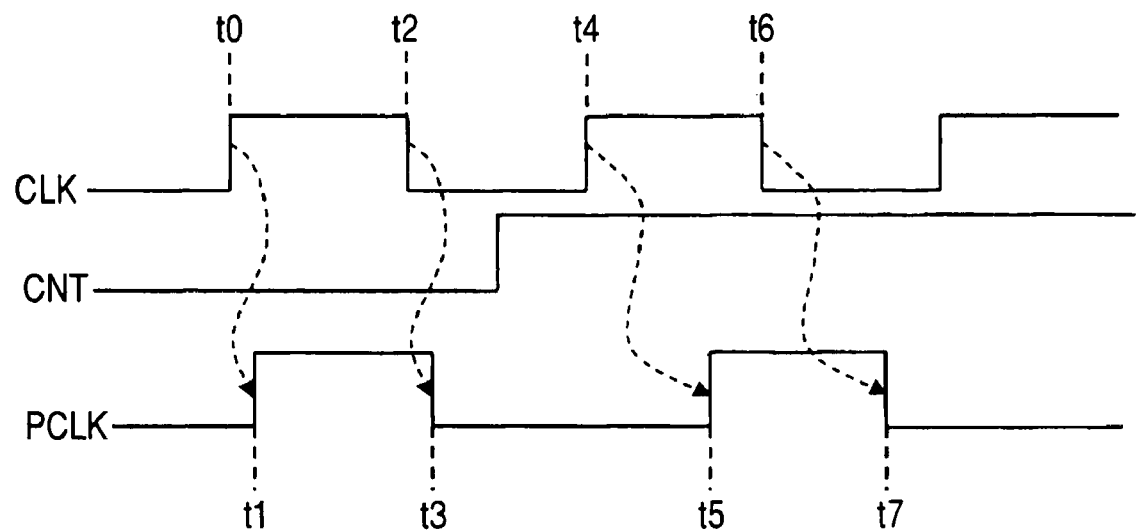
FIG. 8 is a timing chart showing operating timings of the variable delay circuit.

One example of a timing chart showing operating timings of the variable delay circuit 27 is shown in FIG. 8. As compared with the timing chart shown in FIG. 4, the pulse clock signal PCLK outputted from the variable delay circuit 27 is used as a pulse obtained by inverting the above signal SA. Since the clock signal CLK is "1" at a time t0, for example, one input of an AND circuit 38 is brought to "1" and one input of an AND circuit 39 is brought to "1" by means of two inverter circuits 35 and 36. Since a delay control signal CNT is "0", control information set to a register 32 is also brought to "0". At this time, the other input of the AND circuit 38 is brought to "1" because the control information "0" is inverted by an inverter circuit 37. Since the control information "0" is inputted as it is, the other input of the AND circuit 39 is "0". Thus, since the output of the AND circuit 38 reaches "1" and the output of the AND circuit 39 reaches "0", the output of an OR circuit 40 is taken in the form of logical ORing and brought to "1". This results in a pulse clock signal PCLK corresponding to the output of the OR circuit 40. Since the present pulse clock signal PCLK is based on the output of the AND circuit 38, it is brought to "0" at a time t1 with a slight delay amount.

When the clock signal CLK is brought to "0" at a time t2, the one inputs of the AND circuits 38 and 39 are brought to "0" and the output of the OR circuit 40 is brought to "0". The pulse clock signal PCLK is brought to "0" at a time t3. Since the clock signal CLK is brought to "1" again at a time t4 and the delay control signal CNT is "1", the output of the AND circuit 38 is brought to "0" and the output of the AND circuit 39 is brought to "1" from the above logical operation. The output of the OR circuit 40 is taken in the form of logical ORing and brought to "1". This results in a pulse clock signal PCLK corresponding to the output of the OR circuit 40. Since the present pulse clock signal PCLK is based on the output of the AND circuit 39, it is brought to "1" at a time t5 with the delay amounts produced by the two inverter circuits 35 and 36 disposed on their corresponding paths. When the clock signal CLK is brought to "0" at a time t6, the one inputs of the AND circuits 38 and 39 are brought to "0" and the output of the OR circuit 40 is brought to "0". The pulse clock signal PCLK reaches "0" at the time t6.

As described above, the variable delay circuit 27 is capable of shifting each pulse according to the amount of delay based on the delay path selected by the selection circuit 33 without changing the pulse width of the pulse clock signal PCLK. Thus, since the variable delay circuits 27 and 30 as well as the above pulse generators 26 and 29 are disposed in the midstream of the clock wiring 20 over the clock propagation paths 16 and 18 in the clock supply system 11, each pulse of the clock signal can be shifted while its pulse width is being held after the change timing at the falling edge of the clock signal has been made variable. Thus, in the data path in which the combination circuit small in delay amount is disposed, the pulse width is reduced by each of the pulse generators 26 and 29 so that the above MIN delay violation can be avoided. Further, in the following other data path in which the combination circuit large in delay amount is disposed, the corresponding pulse is delayed by each of the variable delay circuits 27 and 30 so that the above MAX delay violation can be avoided. If done in this way, the yields of the microcomputer 1 can be enhanced. Since the variable delay circuit 31 is disposed in the midstream of the clock wiring 20 with the clock supply destination being configured as the edge trigger type sequence circuit 15 in the clock supply system 11, each pulse is shifted while the pulse width of the clock signal CLK is being held, and the timing provided to change the rising edge thereof is made variable, thereby making it possible to avoid a MAX delay violation.

Figure 9:
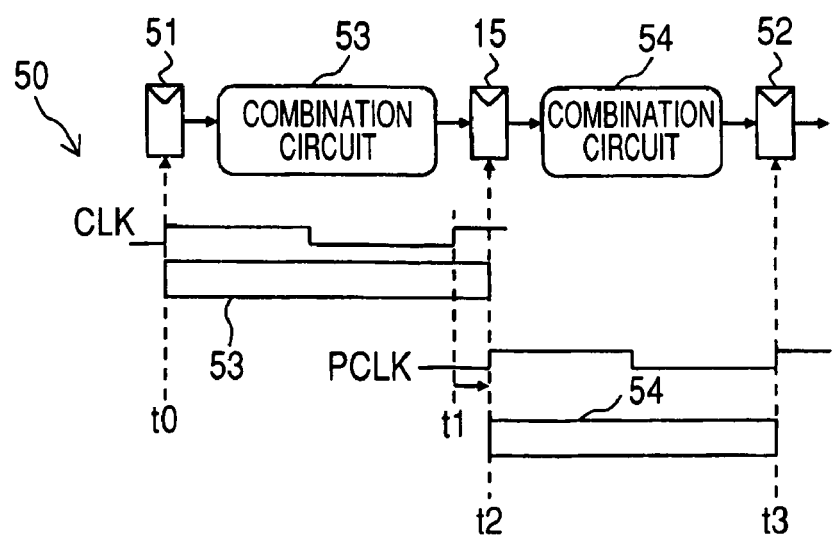
FIG. 9 is an explanatory diagram illustrating a state in which the amount of delay in change timing at the rising edge of a clock signal is enlarged to avoid a MAX delay violation.

A description will now be made, using FIG. 9, of a case in which a MAX delay violation is avoided by increasing the amount of delay in the change timing at each rising edge of the clock signal CLK. A data path 50 is constituted of, for example, three edge trigger type sequence circuits 15, 51 and 52 and combination circuits 53 and 54 respectively placed between these. Since a pre-stage edge trigger type sequence circuit 12 is first brought to an input/output operating period by the change timing at the rising edge of the clock signal CLK at a time t0, it outputs predetermined data to the combination circuit 53. Here, the post-stage edge trigger type sequence circuit 15 is operated such that its input/output operating period is set to a time t1 of the clock signal CLK. On the other hand, the combination circuit 53 is large in delay time and does not reach the completion of arithmetic or computational processing within one cycle of the clock signal CLK. The timing provided to output the result of arithmetic operation becomes a time t2 that has gone beyond or passed the time t1. Therefore, the result of arithmetic operation by the combination circuit 53 is not fetched into the post-stage edge trigger sequence circuit 15, thus causing the MAX delay violation.

Thus, in a test process, for example, the CPU 3 or the like generates a delay control signal CNT "1" for increasing the amount of delay in pulse to shift the pulse and outputs it to its corresponding variable delay circuit 31. In doing so, the variable delay circuit 31 outputs a pulse clock signal PCLK at which the change timing at the rising edge of the clock signal CLK is changed from the time t1 to the time t2, to the edge trigger type sequence circuit 15. Thus, since the timing provided to output the result of arithmetic operation by the combination circuit 53 is located at the time t2 set as the input/output operating period of the post-stage edge trigger type sequence circuit 15, the MAX delay violation can be avoided. As viewed from the combination circuit 54, the edge trigger type sequence circuit 15 configured as the data transmission side outputs predetermined data to the combination circuit 54 at the time t2 of the pulse clock signal PCLK, for example. Since the combination circuit 54 is not so large in delay time, it terminates computing processing within one cycle of the clock signal CLK and outputs the result of arithmetic operation at a time t3. Since the post-stage edge trigger type sequence circuit 52 is brought to an input/output operating period at the time t3, no MAX delay violation is produced thereat.

Figure 10:
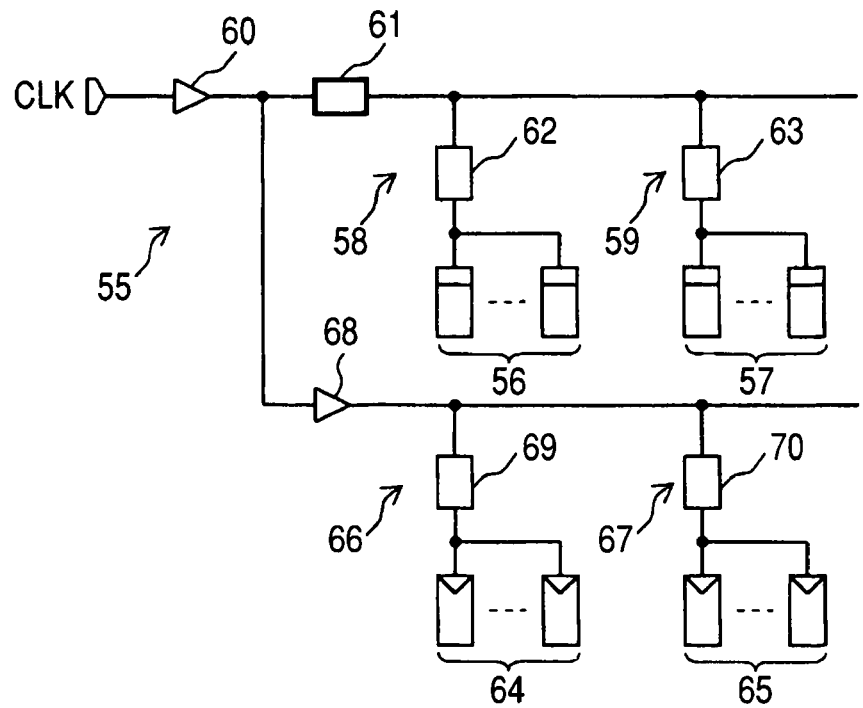
FIG. 10 is an explanatory diagram illustrating another clock supply system.

Another example of the clock supply system is shown in FIG. 10. In the clock supply system 55, a clock buffer 61, a common pulse generator 61 and variable delay circuits 62 and 63 are respectively placed in clock supply paths 58 and 59 extending to level sense type sequence circuits 56 and 57. Thus, since the number of pulse generators necessary for the clock supply paths 58 and 59 can be reduced, a reduction in cost can be attained. The clock buffer 60 and a clock buffer 68, and variable delay circuits 69 and 70 are respectively disposed in clock supply paths 66 and 67 extending to edge trigger type sequence circuits 64 and 65. Each pulse of a clock signal CLK is shifted to enable avoidance of a MAX delay violation.

Figure 11:
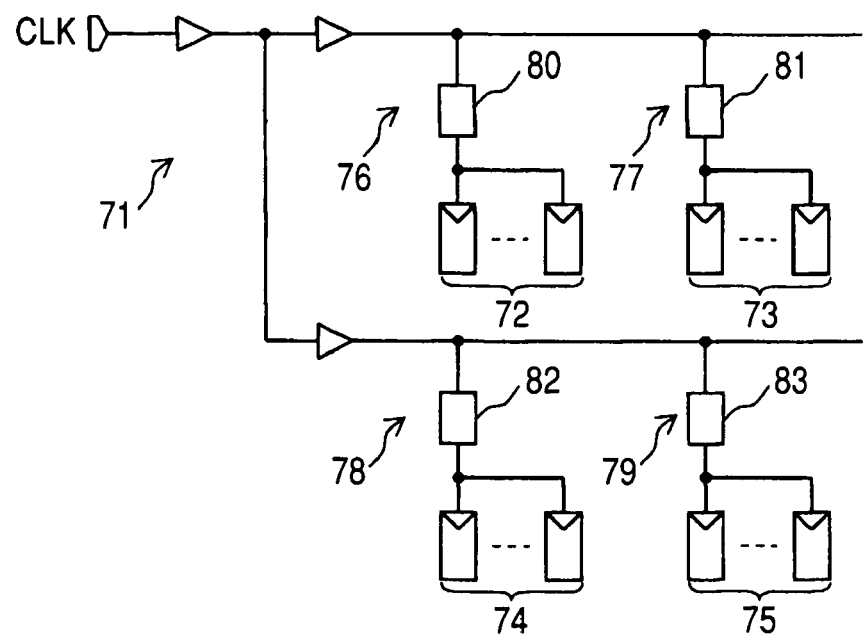
FIG. 11 is an explanatory diagram illustrating a clock supply system applied to a system constituted of an edge trigger type sequence circuit.

One example of a clock supply system applied to a system in which a plurality of sequence circuits are all edge trigger type sequence circuits is shown in FIG. 11. Each of the edge trigger type sequence circuits is brought to the input/output operating period with the change timing at the rising edge of the clock signal as described above. Therefore, the change timing at the rising edge of the clock signal may be varied in the clock supply system 71. To this end, variable delay circuits 80 through 83 are respectively placed in clock supply paths 76 through 79 extending to edge trigger type sequence circuits 72 through 75. In a test process, each pulse of the clock signal is shifted to enable avoidance of a MAX delay violation.

Figure 12:
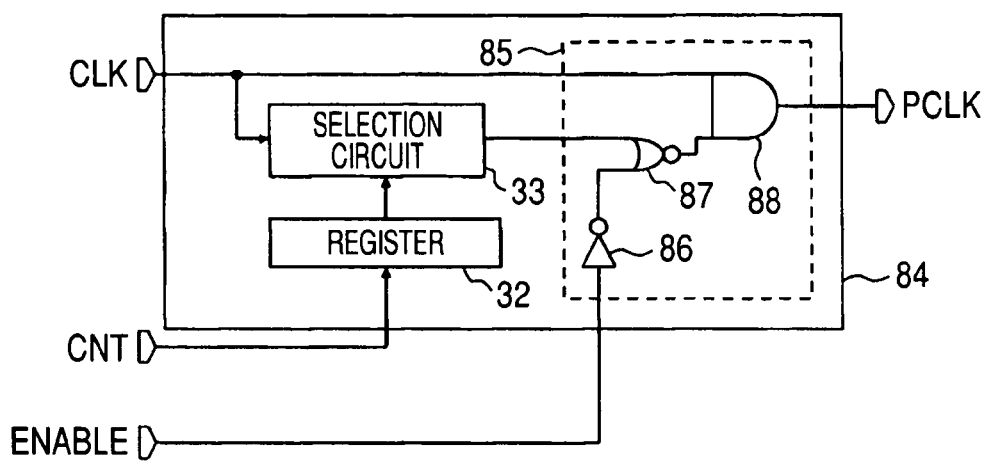
FIG. 12 is an explanatory diagram illustrating another pulse generator.

Another example of the pulse generator is shown in FIG. 12. The pulse generator 84 is different from the above pulse generator 26 in terms of the configuration of a logic circuit 85 as compared with the pulse generator 26. The logic circuit 85 outputs a level change-free signal in accordance with an enable signal ENABLE inputted thereto. The logic circuit 85 has an inverter circuit 86, a negative OR circuit (hereinafter described as NOR circuit) 87 which takes the NORing of two inputs, and an AND circuit 88. The inverter circuit 86 is inputted with the enable signal, and inverts its value and outputs the same therefrom. The NOR circuit 87 performs a logical operation with the output of the inverter circuit 86 and the output of a selection circuit 33 as two inputs. The AND circuit 88 performs ANDing with the output of the NOR circuit 87 and a clock signal CLK as two inputs.

When the value of the enable signal is "0", for example, one input of the NOR circuit 87 is brought to "1". Therefore, the output value of the NOR circuit 87 goes "0" regardless of the output value of the selection circuit 33. Thus, the output value of the AND circuit 88 is brought to "0". That is, if the value of the enable signal is "0", then the pulse generator 84 is operated so as not to level-change a pulse clock signal PCLK. This means that, for example, a functional module brought into a sleep state with no need for the supply of the clock signal is specified in advance by the CPU 3 or the like thereby to make unnecessary the supply of the clock signal to the plural sequence circuits included in the functional module. Simply distributing a clock signal to plural sequence circuits by a clock supply system generally yields consumption of, for example, about one-third the total power consumption in a microcomputer. Therefore, the pulse generator 84 is disposed in each of the above clock supply systems 11 and 55 so that a reduction in power can be attained.

On the other hand, when the value of the enable signal is "1", the one input of the NOR circuit 87 is brought to "0". If the output value of the selection circuit 33 is "1", then the output value of the NOR circuit 87 is brought to "0". Thus, since the output value of the AND circuit 88 becomes "0" regardless of the value of clock signal CLK, the pulse clock signal PCLK is brought to a low level, for example. If the output value of the selection circuit 33 is "0", then the output value of the NOR circuit 87 becomes "1". Thus, since the output value of the AND circuit 88 changes depending upon the value of the clock signal CLK, the pulse clock signal PCLK alternately repeats a high level and a low level, for example. In brief, if the value of the enable signal is "1", then the pulse generator 84 varies timing provided to change its falling edge in a manner similar to the pulse generator shown in FIG. 3.

Second Preferred Embodiment

Figure 13:
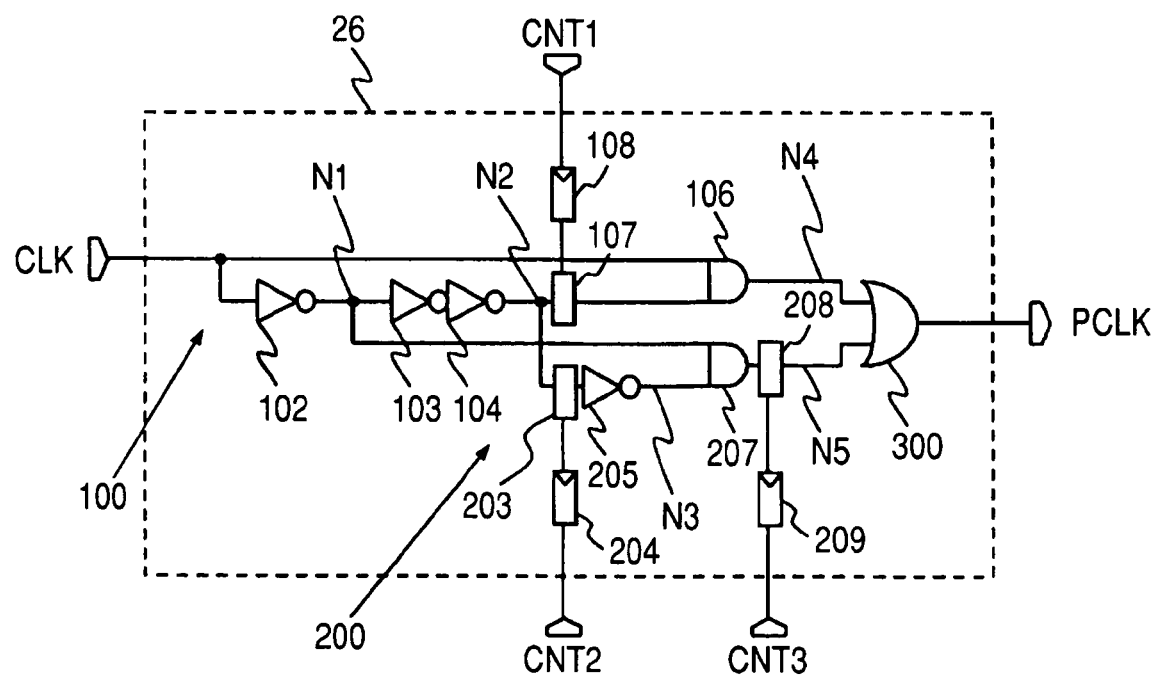
FIG. 13 is an explanatory diagram illustrating another circuit configuration of the above pulse generator.

Another circuit configuration of the above pulse generator 26 is illustrated in FIG. 13. The pulse generator 26 shown in FIG. 13 is a circuit that outputs a clock signal CLK propagated from the corresponding clock generator 2 in accordance with a delay control signal CNT outputted from the CPU 3 or the like, as a pulse clock signal PCLK. The pulse generator 26 includes a first pulse generation section 100 which generates a first pulse signal synchronized with the rising edge of the clock signal CLK, a second pulse generation section 200 which generates a second pulse signal synchronized with the falling edge of the clock signal CLK, and an OR circuit 300 which combines the first pulse signal and the second pulse signal together to form the pulse clock signal PCLK. The pulse clock signal PCLK combined by the OR circuit 300 is transmitted to a post-stage circuit.

The first pulse generation section 100 is configured including inverter circuits 102, 103 and 104 series-connected to one another, a first variable delay circuit 107 capable of adjusting a pulse width of the first pulse signal by delaying a signal outputted from the inverter circuit 104, and an AND circuit 106 which obtains ANDing of the clock signal CLK and a signal outputted from the first variable delay circuit 107. The amount of delay by the first variable delay circuit 107 is determined based on control information set to a register 108 in accordance with the corresponding delay control signal CNT1. The control information is rewritten by the delay control signal CNT.

The second pulse generator 200 includes a second variable delay circuit 203 capable of adjusting a pulse width of the second pulse signal by delaying the signal outputted from the inverter circuit 104, an inverter circuit 205 for inverting the logic of a signal outputted from the second variable delay circuit 203, an AND circuit 207 for obtaining ANDing of a signal outputted from the inverter circuit 205 and a signal outputted from the inverter circuit 102, and a third variable delay circuit 208 capable of adjusting the amount of delay of the output signal of the AND circuit 207. The amount of delay by the second variable delay circuit 203 is determined based on control information set to a register 204 in accordance with the corresponding delay control signal CNT2. The amount of delay by the third variable delay circuit 208 is determined based on control information set to a register 209 in accordance with the corresponding delay control signal CNT3.

In the above circuit configuration, an output node of the inverter circuit 102 is expressed in "N1", an output node of the inverter circuit 104 is expressed in "N2", an output node of the inverter circuit 205 is expressed in "N3", an output node of the AND circuit 106 is expressed in "N4", and an output node of the third variable delay circuit 208 is expressed in "N5", respectively.

Figure 14:
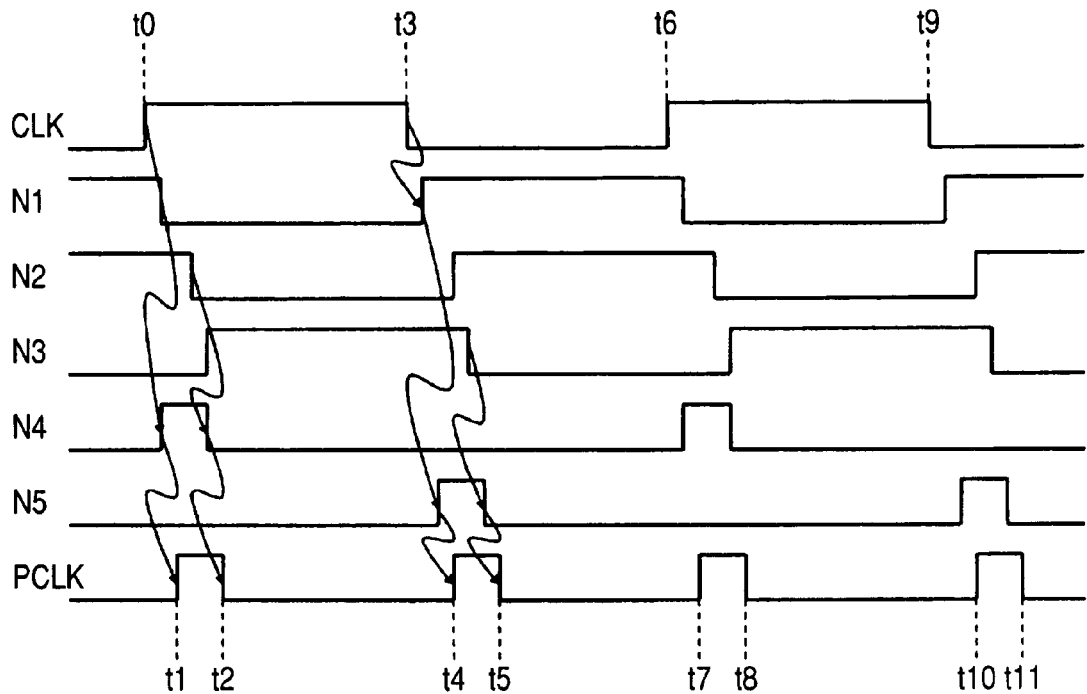
FIG. 14 is a timing chart showing operating timings of the pulse generator shown in FIG. 13.

Operating timings of the principal parts in the circuit shown in FIG. 13 are shown in FIG. 14.

When the clock signal CLK rises at a time t0, the signal at the output node N4 of the AND circuit 106 rises and thereafter the pulse clock signal PCLK rises at a time t1 via the OR circuit 300. The rising edge of the clock signal CLK assumes the falling edge at the output node N2 via the inverter circuits 102, 103 and 104. This allows the signal at the output node N4 of the AND circuit 106 to fall and allows the pulse clock signal PCLK to fall at a time t2. When the input clock signal CLK falls at a time t3, the signal at the output node N1 of the inverter circuit 102 rises and correspondingly the signal at the output node N5 of the AND circuit 207 rises. Thereafter, the pulse clock signal PCLK rises at a time t4 via the OR circuit 300. The rising edge of the output signal of the inverter circuit 102 assumes the falling edge of the signal at the node N3 via the inverter circuits 103, 104 and 205. This allows the signal at the output node N5 of the AND circuit 207 to fall and allows the pulse clock signal PCLK to fall at a time t5.

By repeating the above operations, the pulse clock signal PCLK that rises in sync with both the rising edge and falling edge of the input clock, can be produced.

Figure 15:
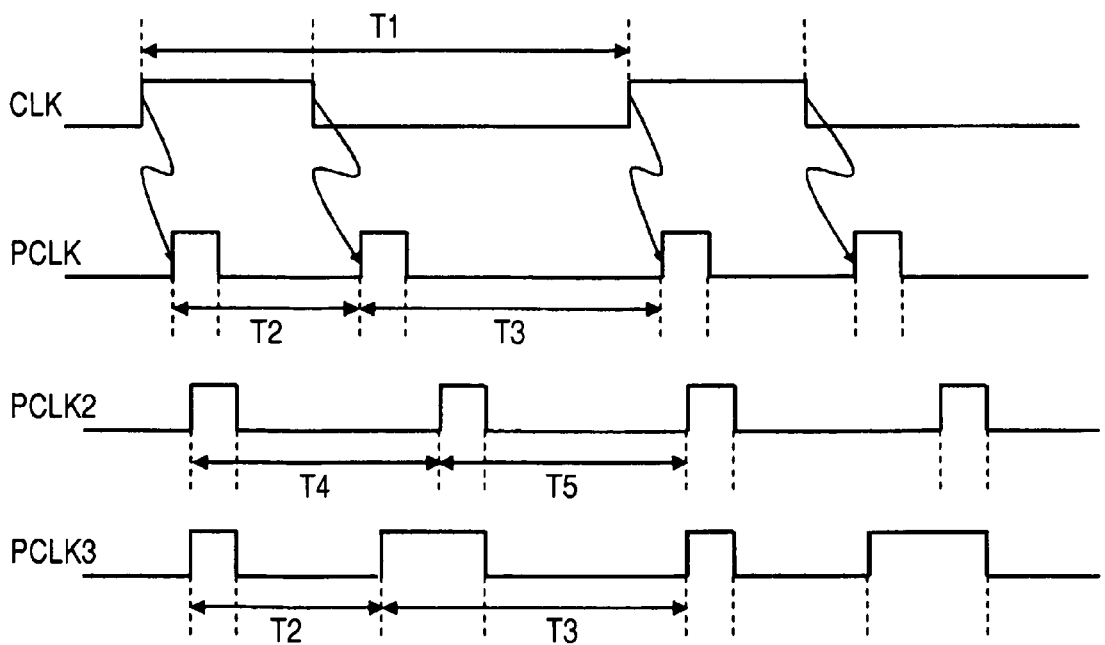
FIG. 15 is another timing chart showing operating timings of the pulse generator shown in FIG. 13.

According to the circuit configuration shown in FIG. 15, the following operative effects can be obtained.

(1) The pulse width of the first pulse signal can be adjusted by changing the amount of delay by the first variable delay circuit 107, and the pulse width of the second pulse signal can be adjusted by changing the amount of delay by the second variable delay circuit 204. Therefore, the change in the amount of delay by the first variable delay circuit 107 and the change in the amount of delay by the second variable delay circuit 203 make it possible to vary the timing provided to change the falling edge of the clock pulse signal PCLK. Thus, the operative effects similar to those obtained in the first embodiment can be obtained.

(2) The rising edge of the pulse clock signal PCLK appears at double the frequency with respect to the rising edge of the clock signal CLK. If the frequency of the pulse clock signal PCLK is 200 MHz, for example, the frequency of the clock signal CLK becomes 100 MHz. When it is desired to operate the in-chip logic circuit at 200 MHz, a clock signal of 100 MHz may be distributed in the clock tree located upstream of the clock pulse generator 26. Thus, the frequency of the clock signal in the clock tree located upstream from the clock pulse generator 26 can be reduced to ½, and power consumption can be reduced with a decrease in the number of charges and discharges.

(3) When the pulse clock signal PCLK that rises in sync with both the rising edge of the input clock and the falling edge thereof is generated, duty (ratio between high-level and low-level periods) of the clock signal CLK grows in importance. When the duty of the clock signal CLK far deviates from 50% as shown in FIG. 15, for example, two types of T2 and T3 can be obtained as cycle time intervals for the pulse clock signal PCLK. In this case, the highest operating frequency of the system is determined by T3 and set lower than T1/T2 considered as ideal essentially. Since the time required for the signal to rise and the time required for the signal to fall cannot be actually set identical after variations in device have been taken into consideration, it is very difficult to set the duty of the clock signal to 50%.

In contrast to this, the first variable delay circuit 107, the second variable delay circuit 203 and the third variable delay circuit 208 can carry out timing control on the signal under such a configuration as shown in FIG. 13. Consequently, the performance of the system can be made close to the ideal. Cycle times of a pulse clock signal can be aligned as indicated by PCLK2 by, for example, increasing the amount of delay by the third variable delay circuit 208 and delaying the signal at the output node N5 (T4=T5). Increasing the amount of delay by the second variable delay circuit 203 and enlarging the high-level period (pulse width) of the signal at the output node N3 of the inverter circuit 205 makes it possible to obtain a pulse clock signal PCLK3 coincident with the pulse clock signal PCLK2 in the fall timing of the pulse clock signal. Since the fall timings of the pulse clock signal are aligned with each other although the periods T2 and T3 differ from each other, the pulse clock signal PCLK3 is set as a pulse clock signal suitable for each pulse latch circuit in particular.

Figure 16:
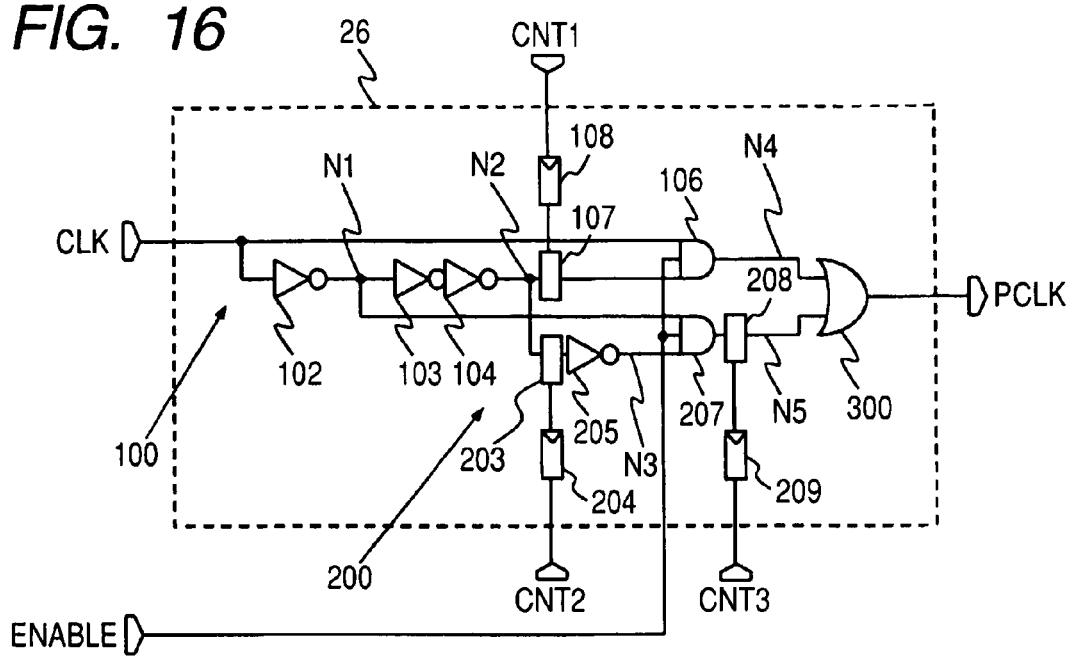
FIG. 16 is an explanatory diagram illustrating a further circuit configuration of the above pulse generator.

A further circuit configuration of the above pulse generator 26 is illustrated in FIG. 16. The pulse generator 26 shown in FIG. 16 is much different from that shown in FIG. 13 in that the operations of AND circuits 106 and 207 are controllable by an enable signal ENABLE.

By bringing the enable signal ENABLE to a low level, the generation of a pulse clock signal PCLK can be stopped. By bringing the enable signal ENABLE to a high level, the pulse clock signal PCLK can be generated. The enable signal ENABLE is transmitted from the CPU 3 or the like shown in FIG. 1.

Figure 17:
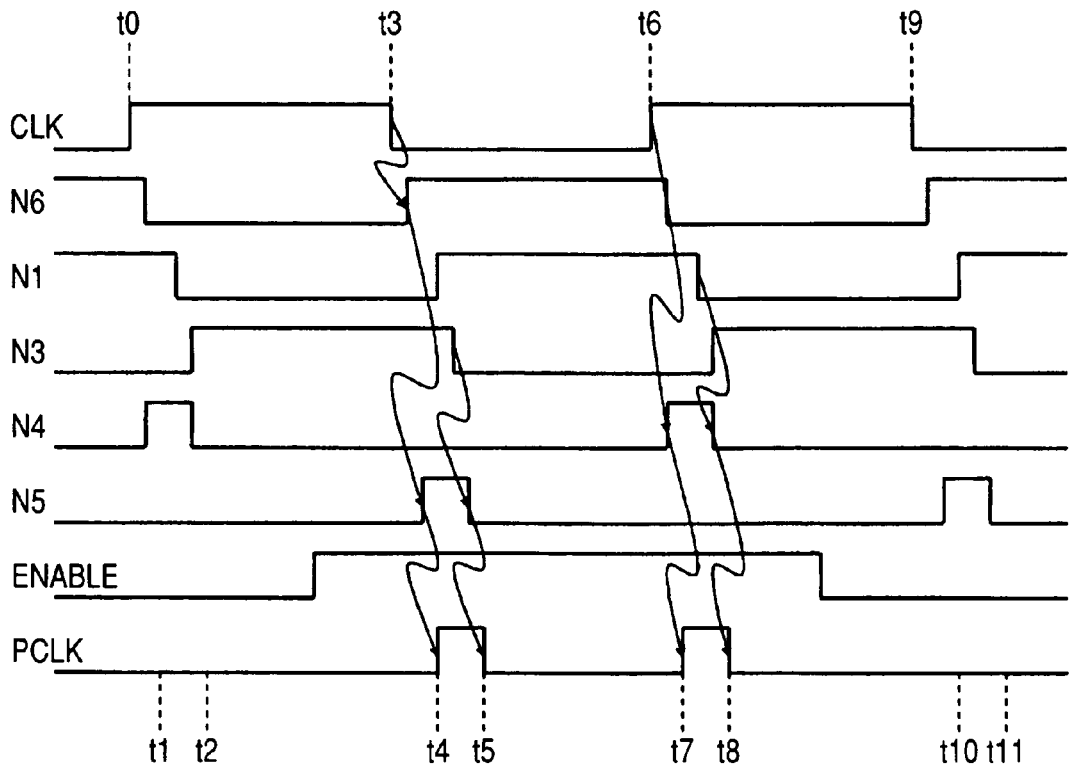
FIG. 17 is a timing chart showing operating timings of the pulse generator shown in FIG. 16.

Operating timings of the principal parts shown in FIG. 16 are shown in FIG. 17.

The enable signal ENABLE is brought to a high level at a time t21 and the pulse clock signal PCLK rises at a time t4. Thereafter, the pulse clock signal PCLK is generated again at a time t7 and the enable signal ENABLE is brought to a low level at a time t81. Therefore, the subsequent generation of the pulse clock signal PCLK is stopped. When the generation of the pulse clock signal PCLK is stopped, the operation of each circuit supplied with the corresponding pulse clock signal PCLK is stopped.

Thus, the generation of the pulse clock signal PCLK can be stopped by bringing the enable signal ENABLE to the low level, and the pulse clock signal PCLK can be generated by bringing the enable signal ENABLE to the high level. Therefore, the operation of the corresponding circuit supplied with the pulse clock signal PCLK is made effective where controlled from the CPU 3.

Figure 18:
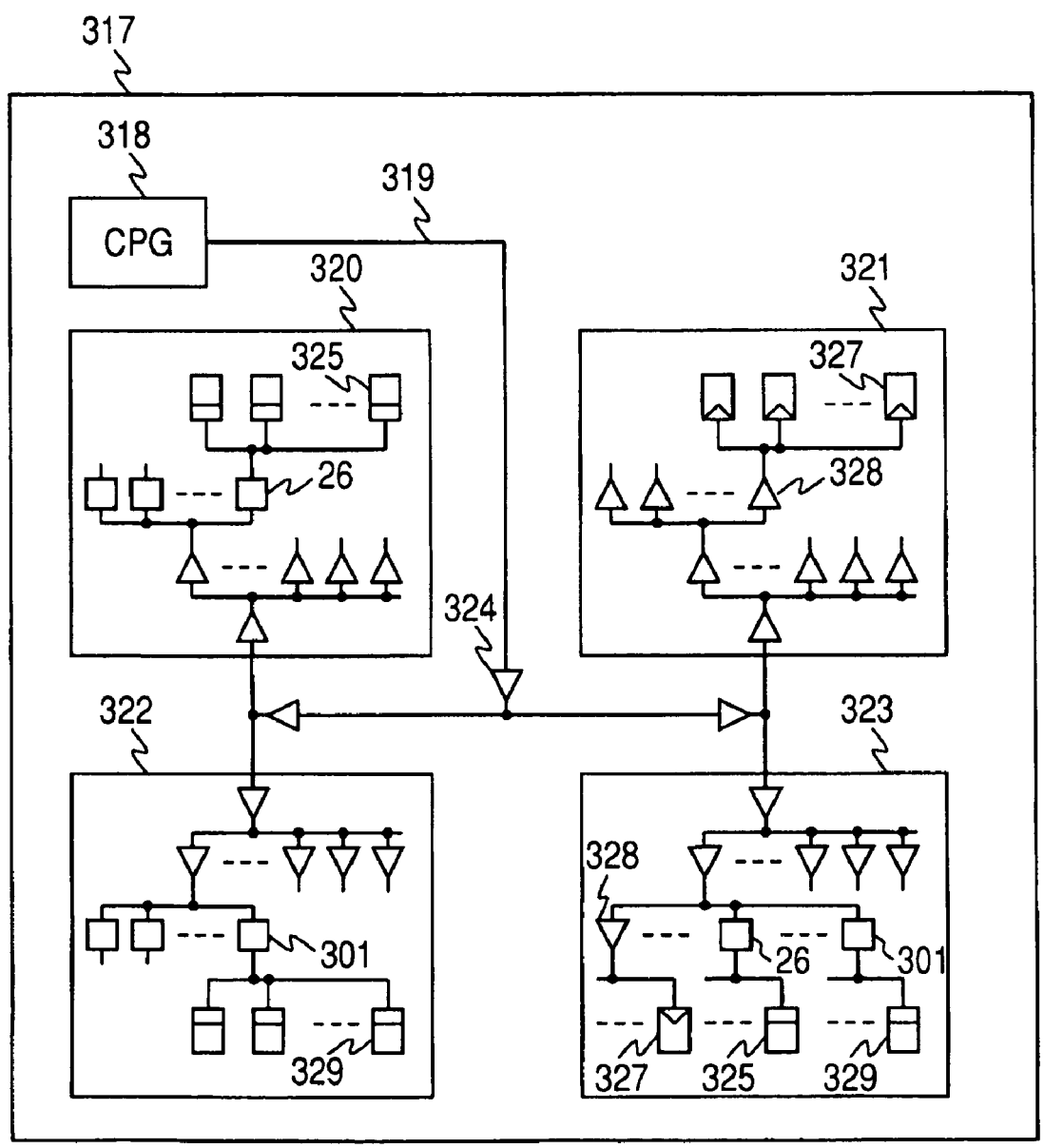
FIG. 18 is an explanatory diagram showing an example to which the above clock pulse generator is applied.

An example to which the above clock pulse generator 26 is applied, is shown in FIG. 18.

Reference numeral 317 indicates a semiconductor integrated circuit chip, reference numeral 318 indicates a clock generator (CPG), reference numeral 319 indicates a clock signal wire, reference numerals 320, 321, 322 and 323 indicate logic IP modules, reference numerals 324 indicate clock buffers, reference numerals 325 indicate pulse latch circuits, reference numeral 26 indicates a clock pulse generator, reference numerals 327 indicate flip-flops, reference numerals 328 indicate clock buffers, reference numerals 329 indicate pulse latch circuits, and reference numerals 330 indicate normal clock pulse generators, respectively. A clock signal generated from the clock generator 318 is distributed to the respective logic IP modules 320, 321, 322 and 323 via the clock signal wire 319 and the clock buffers 324. In the logic IP module 320, the input clock signal is enhanced to a double frequency by the clock pulse generator 26 and supplied to each individual pulse latch circuit 325. In the logic IP module 321, the input clock signal is supplied to the flip-flops 327 by means of the clock buffers 328 at the as-is frequency. In the logic IP module 322, the input clock signal is shaped into a pulse clock signal by the pulse clock generators 301 at the as-is frequency, followed by being supplied to the pulse latch circuits 329. Such a circuit configuration as shown in FIG. 3 can be applied to each clock pulse generator 301. In the logic IP module 323, the input clock signal is used in three ways. As the three ways, may be mentioned, for example, a first case in which the input clock signal is supplied to the flip-flops 327 at the as-is frequency via the clock buffers 328, a second case in which the input clock signal is supplied to the pulse clock circuits 325 as a pulse clock signal having a double frequency via the clock pulse generator 26, and a third case in which the input clock signal is shaped into a pulse clock signal with its frequency held as it is, followed by being supplied to the pulse latch circuits 329 via the clock pulse generators 301.

Constituting, for example, a circuit like a central processing unit requiring a high-speed operation in particular on a semiconductor integrated circuit chip by using the logic IP module 320 makes it possible to suppress the frequency of a clock distributed over the chip and attain low power consumption. By, for example, constituting such user logic, image processing device and other peripheral circuit that the high-speed operation is not required in particular, by the logic IP module 321, the logic IP module 322 and the logic IP module 323 respectively, low power consumption of the whole chip can be achieved by conduction of a study of the application of the clock pulse generator according to the function of each logic IP module.

According to the above configuration, only the logic IP modules can be operated at the double frequency by provision of the clock pulse generator 26 within the specific logic IP module without increasing the frequency at the distribution of the clock from the clock generator 318 to the respective logic IP modules, thus making it possible to attain low power consumption simultaneously with the enhancement of processing performance of the semiconductor integrated circuit chip.

Figure 19:
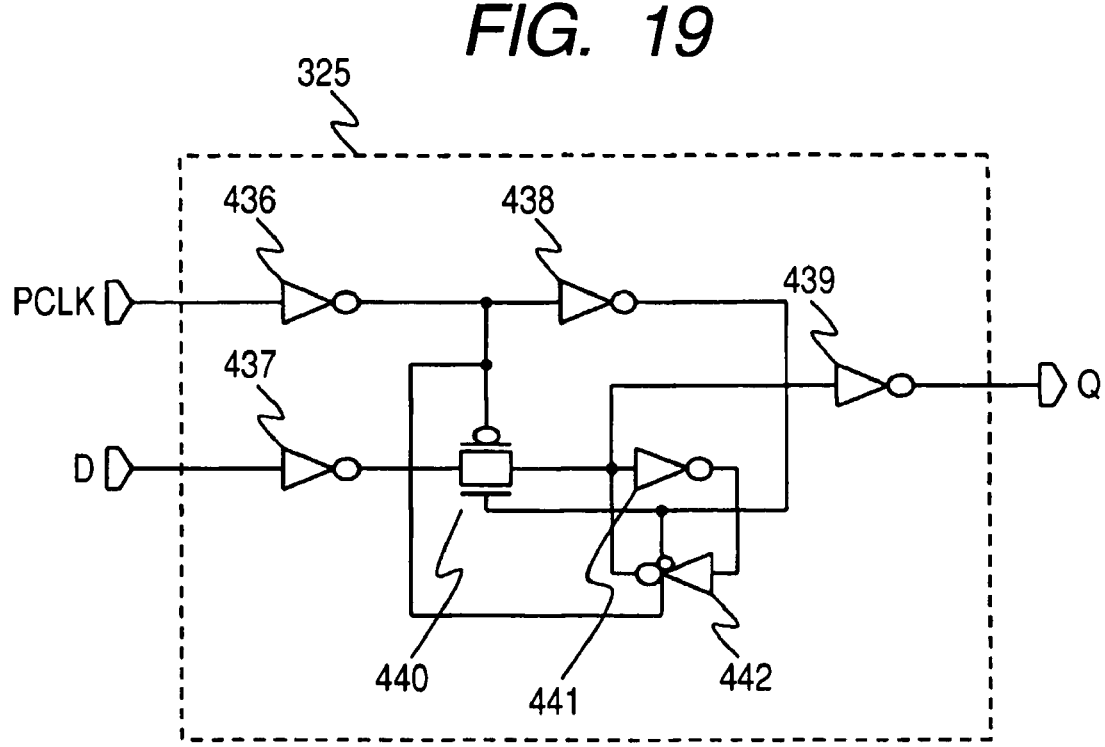
FIG. 19 is an explanatory diagram illustrating a configuration of a pulse latch circuit shown in FIG. 18.

A configurational example of the pulse latch circuit 325 is shown in FIG. 19.

Although not restricted in particular, the pulse latch circuit 325 includes inverter circuits 436, 438, 439, 437 and 441, a clocked inverter circuit 442 and a transmission gate 440 as shown in FIG. 19. The pulse clock signal PCLK generated by the pulse generator 26 is taken in via the inverter circuit 436. When the pulse clock signal PCLK is brought to a high level, data inputted from a data terminal D is propagated to an output terminal Q. When the pulse clock signal PCLK is brought to a low level, the transmission gate 440 is closed so that a value at that time is held by a latch circuit constituted of the inverter circuit 441 and the clocked inverter circuit 442.

Figure 20:
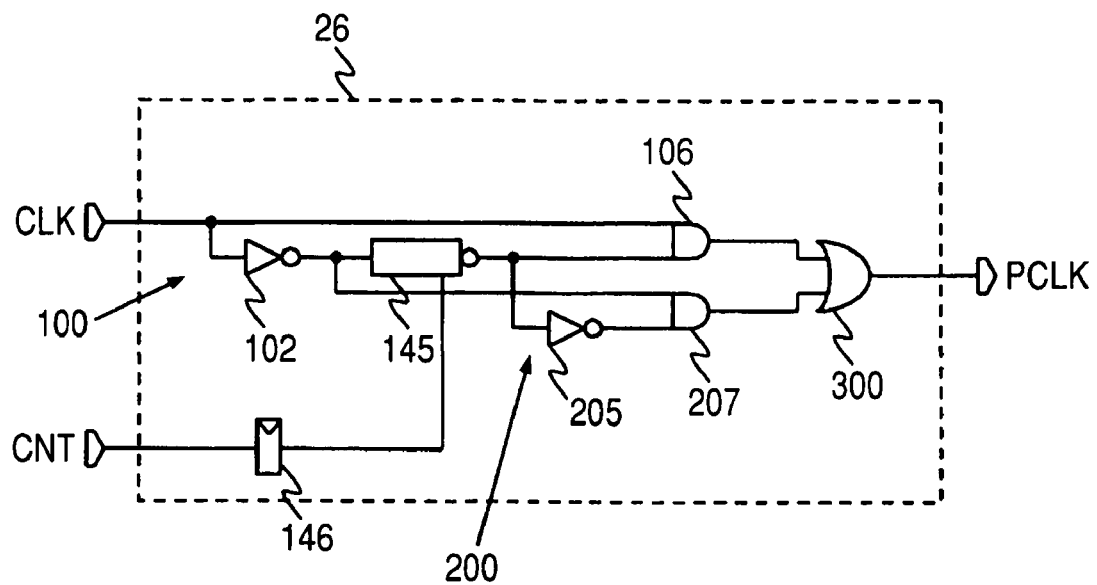
FIG. 20 is an explanatory diagram illustrating a still further circuit configuration of the above pulse generator.

A still further circuit configuration of the pulse generator 26 is illustrated in FIG. 20.

The pulse generator 26 shown in FIG. 20 is much different from that shown in FIG. 13 in that it has a variable delay circuit 145 capable of simultaneously adjusting a pulse width of a first pulse signal obtained by a first pulse generation section 100 and a pulse width of a second pulse signal obtained by a second pulse generation section 200. In FIG. 20, the first pulse generation section 100 includes an inverter circuit 102, a variable delay circuit 145 and an AND circuit 106. The second pulse generation section 200 includes an inverter circuit 205 and an AND circuit 207. The amount of delay by the variable delay circuit 145 is determined based on control information set to a register 146 in accordance with a delay control signal CNT.

Figure 21:
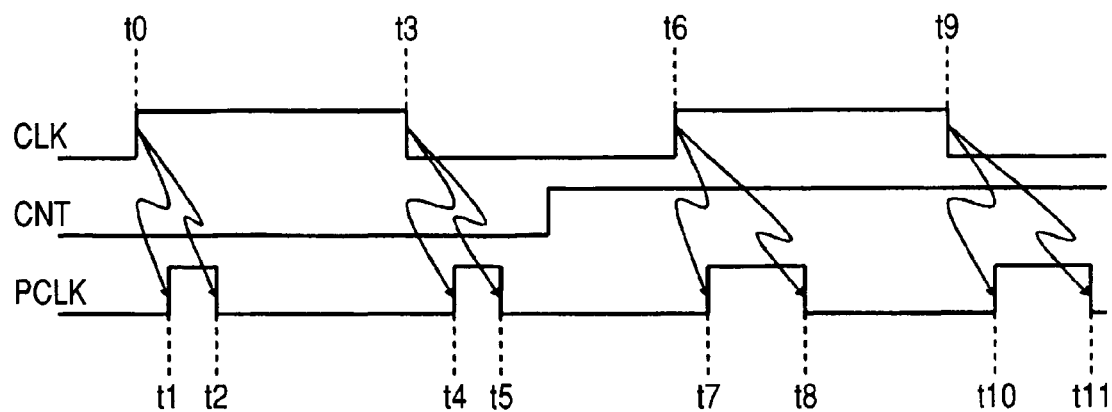
FIG. 21 is a timing chart showing operating timings of the pulse generator shown in FIG. 20.

Operating timings of the principal parts in the circuit shown in FIG. 20 are shown in FIG. 21.

As compared with pulse widths t2-t1 and t5-t4 of a pulse clock signal PCLK generated during a period in which a delay control signal CNT is of a low level, pulse widths t8-t7 and t11-t10 of a pulse clock signal PCLK generated during a period in which the delay control signal CNT is of a high level, spread. That is, the pulse width of the first pulse signal and the pulse width of the second pulse signal can simultaneously be adjusted by the delay control signal CNT. The rising edge of the pulse clock signal PCLK occurs at a double frequency with respect to the rising edge of the clock signal CLK. From this point of view, the circuit shown in FIG. 21 can obtain operative effects similar to those shown in FIG. 13. According to the configuration shown in FIG. 21, since the pulse width of the first pulse signal obtained by the first pulse generation section 100 and the pulse width of the second pulse signal obtained by the second pulse generation section 200 are simultaneously adjusted in the variable delay circuit 145, the variable delay circuits, the delay control signals and the like can be reduced in number as compared with the configuration shown in FIG. 13.

Figure 22:
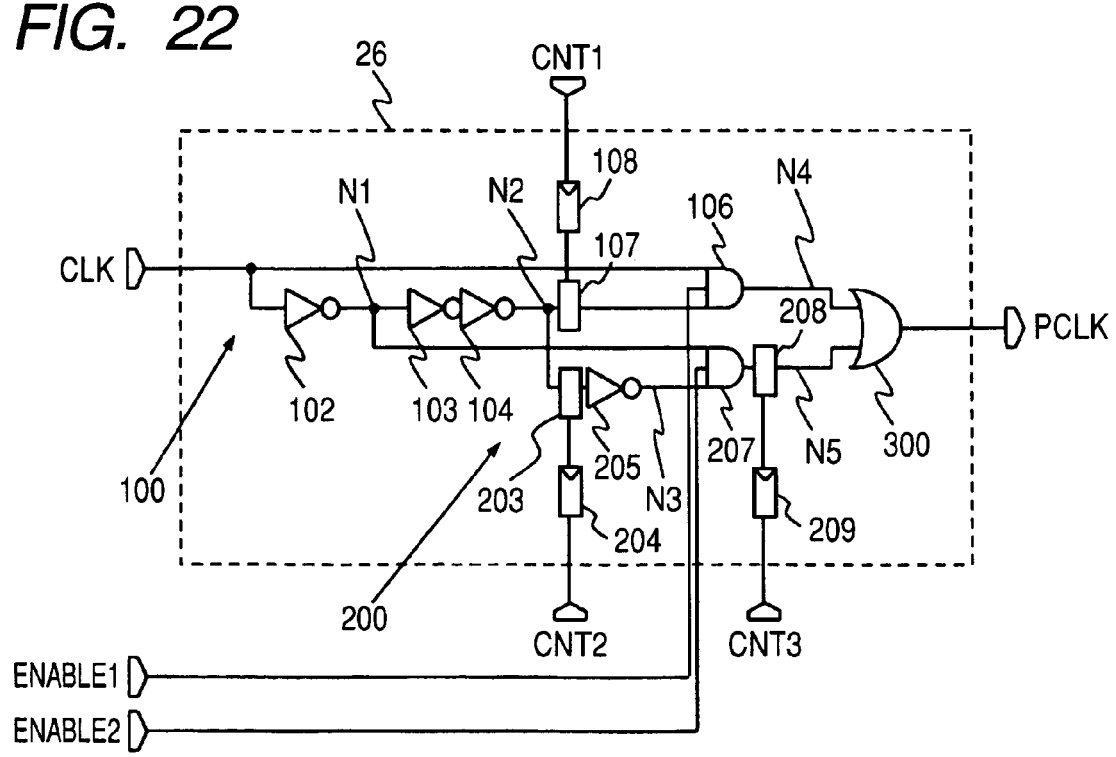
FIG. 22 is an explanatory diagram illustrating a still further circuit configuration of the above pulse generator.

A still further circuit configuration of the pulse generator 26 is illustrated in FIG. 22.

The pulse generator 26 shown in FIG. 22 is much different from that shown in FIG. 16 in that the operations of AND circuits 106 and 207 are individually controllable by enable signals ENABLE1 and ENABLE2. The operation of the AND circuit 106 can be stopped by bringing the enable ENABLE1 to a low level. The operation of the AND circuit 207 can be stopped by bringing the enable signal ENABLE2 to a low level.

Figure 23:
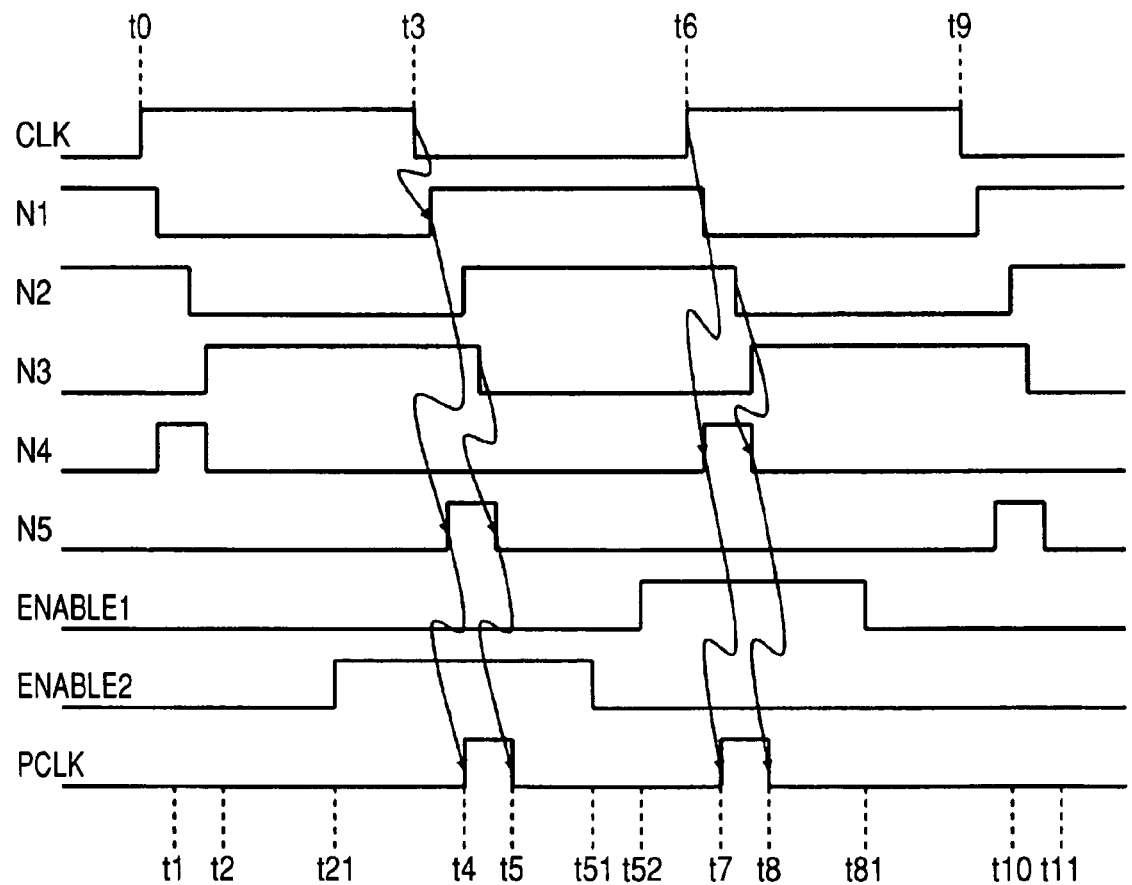
FIG. 23 is a timing chart showing operating timings of the pulse generator shown in FIG. 22.

Operating timings of the principal parts in the circuit shown in FIG. 22 are shown in FIG. 23.

The enable signal ENABLE2 is brought to a high level at a time t21 and the pulse clock signal PCLK rises at a time t4. Further, the enable signal ENABLE1 is brought to a high level at a time t52 and the pulse clock signal PCLK rises at a time t7. It is thus possible to control a gated clock every one cycle in terms of frequency conversion of the pulse clock signal PCLK.

While the invention made above by the present inventors has been described specifically on the basis of the preferred embodiments, the present invention is not limited to the embodiments referred to above. It is needless to say that various changes can be made thereto without the scope not departing from the gist thereof.

When, for example, the combination circuits are not disposed between the level sense type sequence circuits at the data paths, the MIN delay violation becomes easier to occur. Even in such a case, however, the MIN delay violation can be avoided by, for example, making smaller the pulse width of the clock signal by the pulse generator 26.

For example, information to be transmitted to each register as a delay control signal CNT may be stored in a nonvolatile memory such as a fuse placed within a semiconductor integrated circuit chip or a memory connected to the outside and stored in a register as the delay control signal CNT upon power-on reset of the chip. Consequently, delay times different every chip can also be reflected onto their corresponding chips in a predetermined test upon manufacture of the semiconductor integrated circuit chips, and adjustments on delay time intervals matched with characteristics set every device can be carried out.

Although the control information used for control on the clock skew in the test process is stored in the fuse circuit 10, the microcomputer 1 is not limited to this. The control information may be stored in a nonvolatile memory or storage means such as a flash memory. If, for example, the flash memory is adopted, it is then connected to the internal bus 9 and, made controllable by the CPU 3 or the like. Further, although the pre-stage sequence circuits and the post-stage sequence circuits are made identical in kind at the data paths, no restriction is placed on it. The edge trigger type sequence circuits and the level sense type sequence circuits may form the data paths. In this case, MAX and MIN delay violations can be avoided by carrying out a change in pulse width and a shift in pulse according to the type of post-stage sequence circuit. The microcomputer 1 can be applied to appropriate semiconductor products such as a cellular phone, a digital household appliance, etc. required to meet an improvement in operating frequency and a reduction in power.

What is claimed is:

1. A semiconductor integrated circuit comprising:
a clock generator;
a clock wiring which propagates a clock signal outputted from the clock generator to ends thereof via a plurality of branches;
a plurality of sequence circuits connected to the ends of the clock wiring, said plurality of sequence circuits including at least level sense sequence circuits; and
a pulse generator to vary a timing to change the clock signal, which defines an endpoint of an input operating period of each said level sense sequence circuit, said pulse generator being coupled to the clock wiring,
wherein said pulse generator includes:
a first pulse generation section to generate a first pulse signal synchronized with a rising edge of the clock signal;
a second pulse generation section to generate a second pulse signal synchronized with a falling edge of the clock signal; and
a logic circuit which combines the first pulse signal and the second pulse signal together and outputs the result of combination,
wherein the first pulse generation section includes a first variable delay circuit to adjust a pulse width of the first pulse signal,
wherein the second pulse generation section includes a second variable delay circuit to adjust a pulse width of the second pulse signal, and
wherein the second pulse generation section further includes a third variable delay circuit to adjust the amount of delay of the second pulse signal.

2. A semiconductor integrated circuit comprising:
a clock generator;
a clock wiring which propagates a clock signal outputted from the clock generator to ends thereof via a plurality of branches;
a plurality of sequence circuits connected to the ends of the clock wiring, said plurality of sequence circuits including at least level sense sequence circuits; and
a pulse generator to vary a timing to change the clock signal, which defines an endpoint of an input operating period of each said level sense type sequence circuit, said
pulse generator being coupled to the clock wiring,
wherein said pulse generator includes:
a first pulse generation section to generate a first pulse signal synchronized with a rising edge of the clock signal;
a second pulse generation section to generate a second pulse signal synchronized with a falling edge of the clock signal; and
a logic circuit which combines the first pulse signal and the second pulse signal together and outputs the result of combination, wherein the first pulse generation section and the second pulse generation section respectively include control logic to stop transmission of the first pulse signal and the second pulse signal to the logic circuit based on a common enable signal.

3. A semiconductor integrated circuit comprising:

a clock generator;

a clock wiring which propagates a clock signal outputted from the clock generator to ends thereof via a plurality of branches;

a plurality of sequence circuits connected to the ends of the clock wiring, said plurality of sequence circuits including at least level sense sequence circuits; and a pulse generator to vary a timing to change the clock signal, which defines an endpoint of an input operating period of each said level sense type sequence circuit, said pulse generator being coupled to the clock wiring, wherein said pulse generator includes:

a first pulse generation section to generate a first pulse signal synchronized with a rising edge of the clock signal;

a second pulse generation section to generate a second pulse signal synchronized with a falling edge of the clock signal; and a logic circuit which combines the first pulse signal and the second pulse signal together and outputs the result of combination, wherein the first pulse generation section includes a first control logic to stop transmission of the first pulse signal to the logic circuit based on a first enable signal, and wherein the second pulse generation section includes a second control logic to stop transmission of the second pulse signal to the logic circuit based on a second enable signal.

* * * * *